(12) United States Patent
Tajima et al.

(10) Patent No.: US 8,963,979 B2
(45) Date of Patent: Feb. 24, 2015

(54) FIXING STRUCTURE FOR FIXING OPTICAL ELEMENT, LASER SCANNING APPARATUS, IMAGE FORMING APPARATUS, AND METHOD FOR FIXING OPTICAL ELEMENT

(71) Applicant: Konica Minolta, Inc., Tokyo (JP)

(72) Inventors: Naoki Tajima, Sagamihara (JP); Yasushi Nagasaka, Okazaki (JP); Takahiro Matsuo, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/895,613

(22) Filed: May 16, 2013

(65) Prior Publication Data

US 2013/0308172 A1 Nov. 21, 2013

(30) Foreign Application Priority Data

May 21, 2012 (JP) ................................. 2012-115223
Jul. 5, 2012 (JP) ................................. 2012-150962

(51) Int. Cl.
| | | |
|---|---|---|
| *B41J 15/14* | (2006.01) | |
| *B41J 27/00* | (2006.01) | |
| *G02B 7/00* | (2006.01) | |
| *G02B 26/10* | (2006.01) | |
| *G02B 26/08* | (2006.01) | |
| *G02B 26/12* | (2006.01) | |

(52) U.S. Cl.
CPC .............. *G02B 7/003* (2013.01); *G02B 26/10* (2013.01); *G02B 7/004* (2013.01); *G02B 26/0825* (2013.01); *G02B 26/125* (2013.01)
USPC ......................................... 347/242; 347/257

(58) Field of Classification Search
USPC .......................... 347/241–245, 256–258, 263
See application file for complete search history.

(56) References Cited

U.S. PATENT DOCUMENTS

| | | | |
|---|---|---|---|
| 4,496,209 A | 1/1985 | Itoh et al. | |
| 4,639,072 A | 1/1987 | Itoh et al. | |
| 7,956,882 B2 * | 6/2011 | Nakajima | ..................... 347/234 |
| 2003/0142380 A1 * | 7/2003 | Koreeda | ....................... 359/204 |

FOREIGN PATENT DOCUMENTS

| | | | | |
|---|---|---|---|---|
| JP | 58-179814 | 10/1983 | | |
| JP | 03-233423 | 10/1991 | | |
| JP | 08094913 A | * 4/1996 | ............. | G02B 7/198 |

(Continued)

OTHER PUBLICATIONS

Japanese Office Action, Notification of Reasons for Refusal, Patent Application No. 2012-115223. Dispatch Date: Jul. 8, 2014 (3 pages).

(Continued)

*Primary Examiner* — Hai C Pham
(74) *Attorney, Agent, or Firm* — Lucas & Mercanti, LLP

(57) ABSTRACT

A fixing structure for fixing an optical element at a predetermined position in an optical device, the fixing structure has a plurality of first pressing members to fix the optical element at at least two positions on a surface of the optical element orthogonal to an optical axis of the optical element and a second pressing member to fix the optical element at a predetermined position on a surface of the optical element to the optical axis. A depth of pressing of the surface of the optical element by a tip of the second pressing member is larger than the depth of pressing of the surface of the optical element by the tips of the first pressing members.

13 Claims, 23 Drawing Sheets

(56) References Cited

FOREIGN PATENT DOCUMENTS

| | | |
|---|---|---|
| JP | H08-094913 | 4/1996 |
| JP | 09-127392 | 5/1997 |
| JP | 11-281865 A | 10/1999 |
| JP | 2001-166235 | 6/2001 |
| JP | 2003-207733 A | 7/2003 |
| JP | 2007-065500 A | 3/2007 |
| JP | 2007-140335 | 6/2007 |
| JP | 2008-003373 A | 1/2008 |
| JP | 2008-292234 A | 12/2008 |
| JP | 4744125 B2 | 5/2011 |

OTHER PUBLICATIONS

English translation of Japanese Office Action, Notification of Reasons for Refusal, Patent Application No. 2012-115223. Dispatch Date: Jul. 8, 2014 (9 pages).

Japanese Office Action, Notification of Reasons for Refusal, Patent Application No. 2012-150962. Dispatch Date: Oct. 28, 2014 and English translation thereof.

* cited by examiner

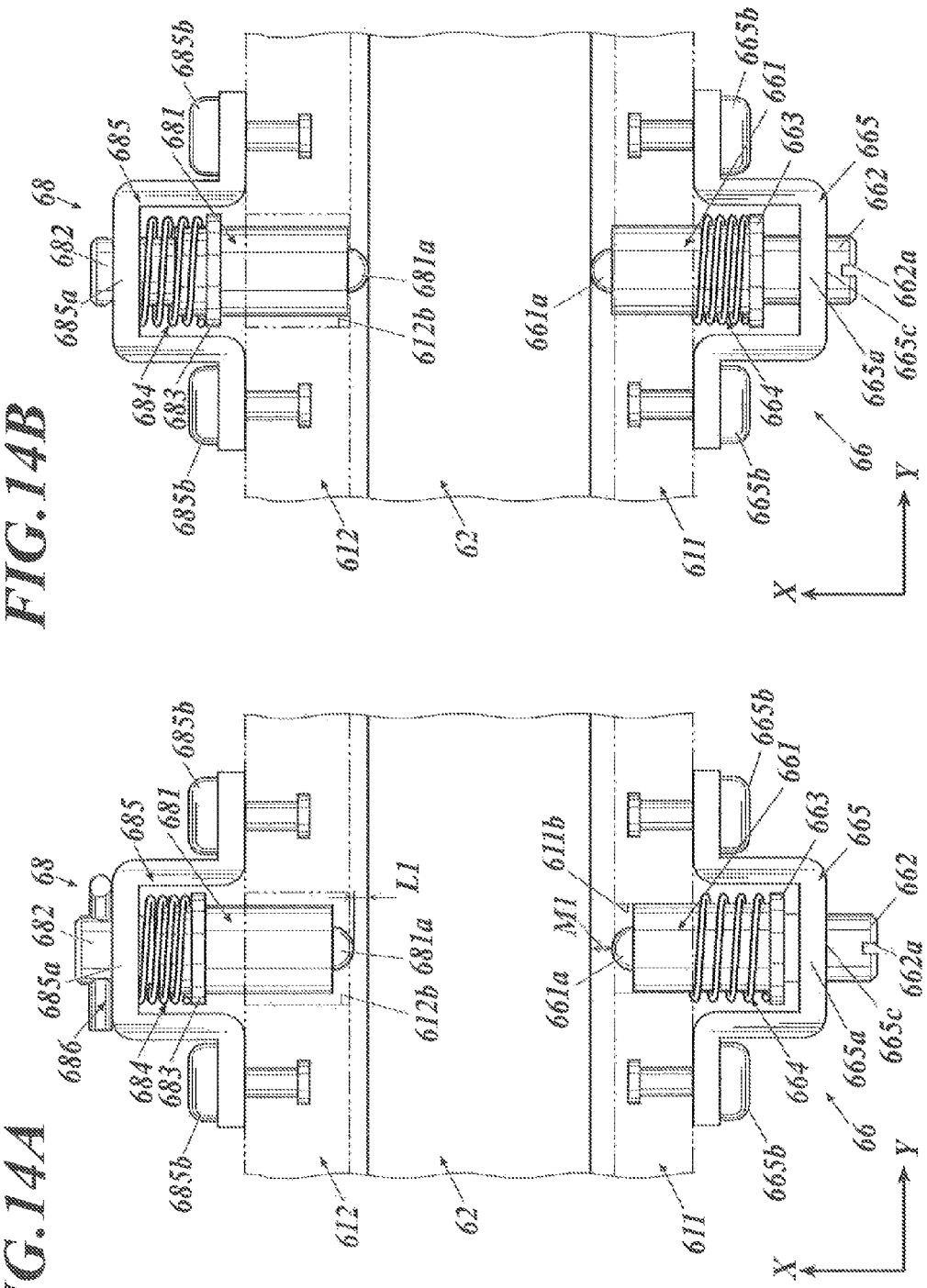

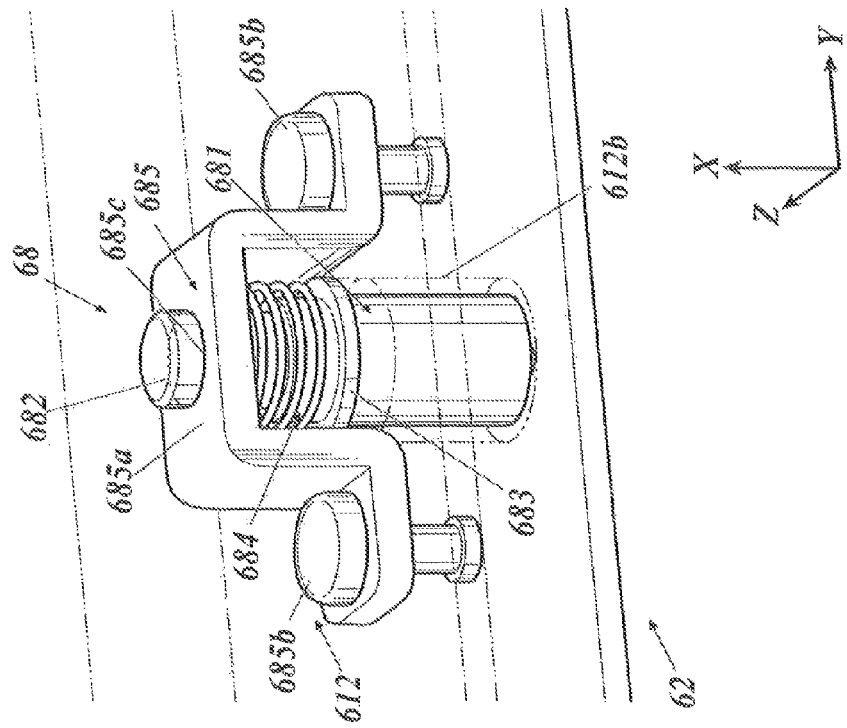
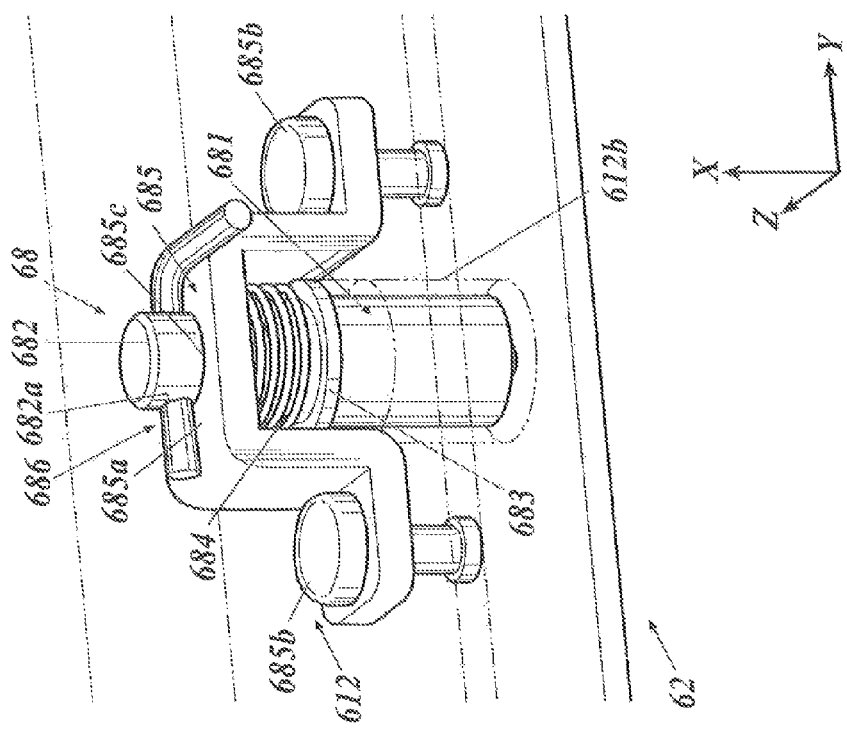

FIXING STRUCTURE FOR FIXING OPTICAL ELEMENT, LASER SCANNING APPARATUS, IMAGE FORMING APPARATUS, AND METHOD FOR FIXING OPTICAL ELEMENT

BACKGROUND

1. Field of the Invention

The present invention relates to a fixing structure for fixing an optical element, a laser scanning apparatus including the fixing structure for fixing the optical element, an image forming apparatus including the laser scanning apparatus, and a method for fixing the optical element in the fixing structure for fixing the optical element.

2. Description of Related Art

Heretofore, an image forming apparatus, such as a laser printer and a digital copier, is equipped with a laser scanning apparatus which scans a photoreceptor with laser light emitted from a semiconductor-laser light source held by a light source holder.

Recently, expected performance for the laser scanning apparatus has become higher, and also performance of the optical element and attaching accuracy of the optical element has tended to become higher. An elongated optical element is hard to handle because the elongated optical element is easily deformed when attached and fixed to an optical element holder. In a reflective optical system, compared with a transmission optical system, an error of the attaching position and the deformation of the optical element have a large influence on an irradiation position of the laser light on the photoreceptor. Therefore, in the reflective optical system, it is very difficult to ensure accuracy of the irradiation position of the laser light on the photoreceptor even when an environment changes.

Accordingly, there has been a demand for a method for attaching the optical element to the optical element holder by which method the optical element is not subject to stress and misalignment due to the environmental change after the attachment is reduced.

As conventional attaching method of the optical element, Japanese Patent Application Laid-open No. 11-281865 discloses a configuration where an optical element is positioned by positioning pins whose tips have radiuses (or radiuses of curvature) same as one another.

Japanese Patent Application Laid-open No. 2007-65500 discloses a configuration where an optical element is sandwiched between positioning pins and elastic members whose tip shapes are same as that of the surface of the optical element.

Japanese Patent Application Laid-open No. 2008-3373 discloses a configuration where a whole adhesive surface of an optical element is bonded and fixed to a base using an ultraviolet curing adhesive.

Japanese Patent Application Laid-open No. 2003-207733 discloses a configuration where an optical element is bonded and fixed to a base using an ultraviolet curing adhesive after the position of the optical element is adjusted.

Japanese Patent No. 4744125 disclose a conventional optical element fixing structure including: elastic members which press an elongated optical element by an elastic force; and holding members and adjustment members, each of which is paired with each of the elastic members, and which support the elongated optical element against a pressing force of the elastic member. In the optical element fixing structure, the holding members fixed to a holder member or integrated with the holder member support both end portions in a longitudinal direction of the elongated optical element, and the adjustment members held by the holder member is movable in a direction of the pressing force of the elastic member. According to the technique disclosed in this document, a strain amount of the elongated optical element can be adjusted and thereby beam position performance such as a scanning line deviation can be corrected, which deviation occurs due to a form error and/or an assembly error of the elongated optical element or other optical components whose form is deviated away from an ideal state.

However, since the technique disclosed in Japanese Patent Application Laid-open No. 11-281865 fixes the optical element using the positioning pins whose tips have radiuses same as one another, there is a problem that the optical element cannot be positioned in a circumferential direction and rotation about an optical axis of the optical element cannot be suppressed.

Moreover, since the technique disclosed in Japanese Patent Application Laid-open No. 2007-65500 fixes the optical element using the positioning pins whose tip shapes are same as that of the surface of the optical element, there is a problem that a base point from which stretching in a longitudinal direction of the optical element occurs due to a length difference in linear expansion cannot be defined and misalignment of the optical element occurs in the case that expansion and contraction are repeated due to the environmental change.

Furthermore, since the technique disclosed in Japanese Patent Application Laid-open No. 2008-3373 bonds and fixes the whole adhesive surface of the optical element to the base using the ultraviolet curing adhesive, there is a problem that when a linear expansion coefficient of the optical element is different from that of the base, the optical element is deformed due to a temperature change and thereby a formed image is degraded.

Moreover, since the technique disclosed in Japanese Patent Application Laid-open No. 2003-207733 bonds and fixes the optical element using the ultraviolet curing adhesive after the position of the optical element is adjusted without providing a fixing member for temporarily fixing the optical member, there is a possibility that misalignment of the optical element occurs due to expansion/contraction of the ultraviolet curing adhesive.

Furthermore, according to the optical element fixing structure disclosed in Japanese Patent No. 4744125, the correction of the beam position performance makes the optical element distorted to produce stress. This stress changes due to repetition of the environmental change, which results in a problem in that the beam position performance is changed from a time point of an initial adjustment.

In addition, in the case that an optical element is a reflective optical system such as a mirror, when the optical element is distorted for correcting the beam position performance, there is encountered a problem that beam imaging performance such as a beam diameter and a field curvature are largely degraded.

SUMMARY

The present invention is devised to solve the problems described above, and an object of the present invention is to provide: a fixing structure for fixing an optical element, which structure can largely suppress the misalignment of the optical element and fix the optical element with no strain; a laser scanning apparatus including the fixing structure for fixing the optical element; an image forming apparatus including the laser scanning apparatus; and a method for fixing the optical element in the fixing structure for fixing the optical element.

To solve at least one of the above problems, a fixing structure in which an aspect of the present invention is reflected is a fixing structure for fixing an optical element at a predetermined position in an optical device, the fixing structure including: a plurality of first pressing members to fix the optical element at at least two positions on a surface of the optical element orthogonal to an optical axis of the optical element; and a second pressing member to fix the optical element at a predetermined position on a surface of the optical element to the optical axis; and wherein a depth of pressing of the surface of the optical element by a tip of the second pressing member is larger than the depth of pressing of the surface of the optical element by the tips of the first pressing members.

Moreover, a fixing structure in which an aspect of the present invention is reflected is a fixing structure for fixing an optical element at a predetermined position in an optical device including: a holding member to hold the optical element at a predetermined holding position; an adjustment member to adjust the holding position by pressing a surface of the optical element held by the holding member; and a pressing member to press the optical element the holding position of which is adjusted by the adjustment member; and wherein the adjustment member is configured to be able to be held at a first retract position, and presses the surface of the optical element by moving from the first retract position toward the optical element, and wherein the pressing member is configured to be able to be held at a second retract position located opposite to the adjustment member across the optical element, and presses the optical element by moving from the second retract position toward the optical element.

Furthermore, a fixing method in which an aspect of the present invention is reflected is a fixing method to fix an optical element at a predetermined position in an optical device including the steps of: holding the optical element at a predetermined holding position; moving an adjustment member held at a first retract position toward the optical element to press the optical element for adjustment of the holding position; and thereafter moving a pressing member held at a second retract position opposite to the adjustment member across the optical element toward the optical element to press the optical element.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 14A is a side view illustrating configurations of an adjustment pin and a second pressing pin according to the second embodiment;

FIG. 14B is a side view illustrating the configurations of the adjustment pin and second pressing pin according to the second embodiment;

FIG. 15A is a perspective view illustrating the configuration of the second pressing pin according to the second embodiment;

FIG. 15B is a perspective view illustrating the configuration of the second pressing pin according to the second embodiment;

DETAILED DESCRIPTION OF THE PREFERRED EMBODIMENT

Hereinafter, a first embodiment of the present invention will be described with reference to the drawings.

Figure 1:
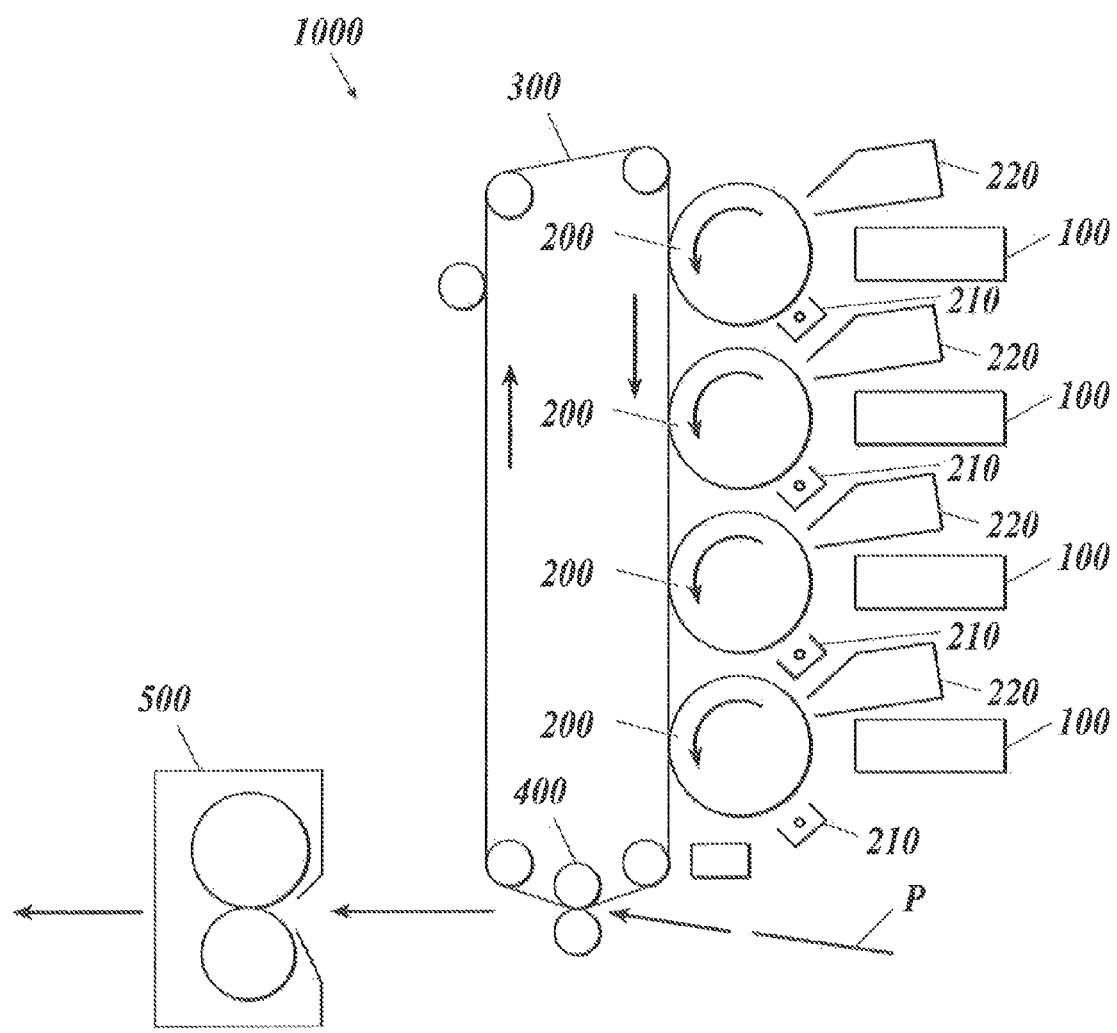
FIG. 1 is a diagram illustrating a schematic configuration of an image forming apparatus according to a first embodiment.

An image forming apparatus 1000 according to a first embodiment is used as a laser printer or a digital copier, for example. As illustrated in FIG. 1, the image forming apparatus 1000 includes: a plurality of laser scanning apparatuses 100 which is provided for respective colors of cyan, magenta, yellow, and black; photoreceptors (irradiated bodies or image carrier) 200, such as photosensitive drums, which are provided to correspond to the respective laser scanning apparatuses 100; charging units 210 which charge the respective photoreceptors 200; developing units 220 which supply developer to the respective photoreceptors 200 which have irradiated with laser light to visualize electrostatic latent images using the developer; an intermediate transferring belt 300; transferring rollers (transferring unit) 400 which transfer the image developed with the developer to a recording medium; and a fixing unit 500 which fixes the image to the recording medium, which image has been transferred by the transferring roller 400 and developed with the developer.

The image forming apparatus 1000 supplies the developer to the photoreceptor 200, on which the electrostatic latent image has been formed with the laser light irradiated from the laser scanning apparatus 100, to visualize the electrostatic latent image so as to be an image formed with the developer, and transfers the image formed with the developer onto the intermediate transferring belt 300. Next, the image forming apparatus 1000 makes the transferring rollers 400 press the image formed with the developer to a sheet P as the recording medium, which image has been transferred onto the intermediate transferring belt 300, so that the image formed with the developer is transferred to the sheet P, and makes the fixing unit 500 heat and pressurize the sheet P to fix the image formed with the developer onto the sheet P. Then, the image forming apparatus 1000 makes a sheet discharge roller (not illustrated) or the like convey the sheet P to discharge the same to a tray (not illustrated), thereby performing an image forming process.

Figure 2:
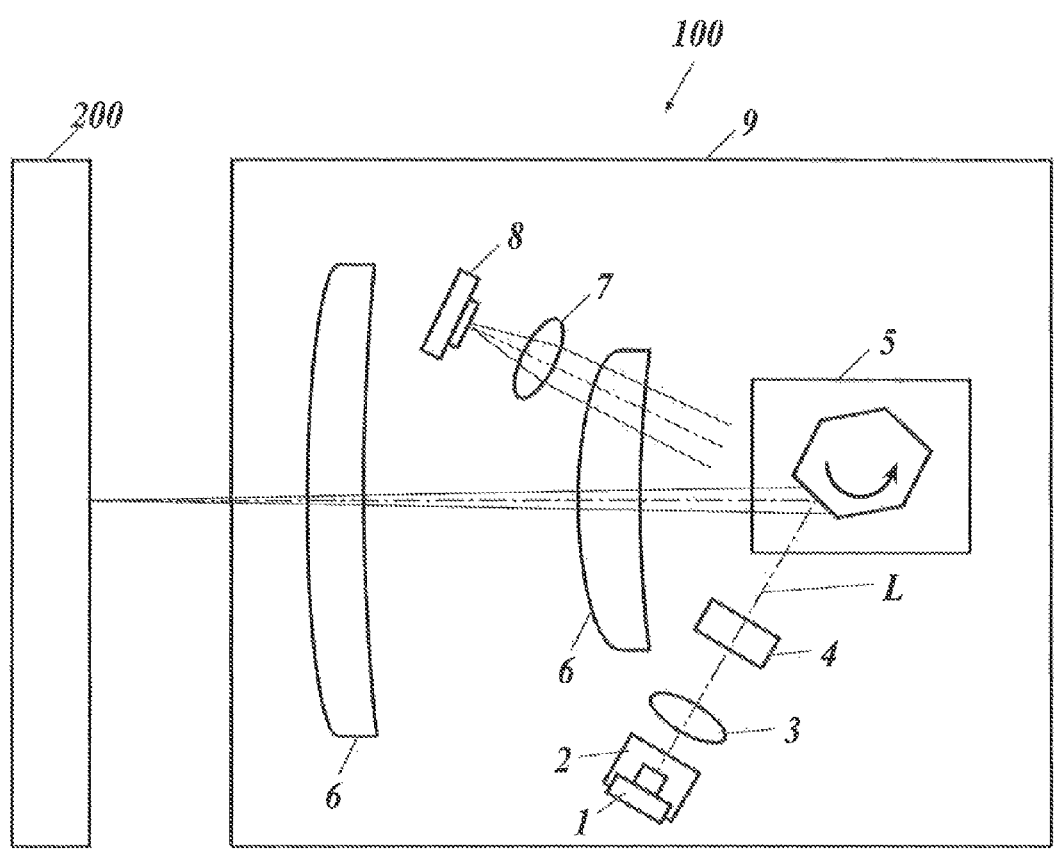
FIG. 2 is a diagram illustrating a schematic configuration of a laser scanning apparatus according to the first embodiment.

As illustrated in FIG. 2, each laser scanning apparatus 100 is an apparatus which irradiates each photoreceptor 200, which has been charged by each charging unit 210, with the laser light L to form the electrostatic latent image on the photoreceptor 200. The laser scanning apparatus 100 includes: a light source 1 which emits laser light L; a light source holder 2 which holds the light source 1; a first optical system 3 which parallelizes the laser light L emitted from the light source 1; a second optical system 4 which converges only a component(s) in sub-scanning direction of the laser light L transmitted through the first optical system 3; a deflection unit 5 which deflects the laser light L transmitted through the second optical system 4; a third optical system 6 which condenses the laser light L deflected by the deflection unit 5 onto the photoreceptor 200; a fourth optical system 7 which condenses part of the laser light L deflected by the deflection unit 5; and a sensor 8 to which the laser light L transmitted through the fourth optical system 7 is input. The laser scanning apparatus 100 includes an optical housing 9 which holds the above components.

The light source 1 is a semiconductor laser which emits the laser light L. The first optical system 3 is irradiated with the laser light L emitted from the light source 1.

The light source holder 2 is a holder which holds the light source 1.

The first optical system 3 includes a collimator lens and the like, and converts the laser light L emitted from the light source 1 into parallel light.

The second optical system 4 is configured to include a slit and a cylindrical lens. The second optical system 4 limits a transmission amount of the laser light L converted into the parallel light by the first optical system 3 such that a beam spot is shaped on the photoreceptor 200 by the slit. The second optical system 4 converges the laser light L, which has been converted into the parallel light by the first optical system 3, in a sub-scanning direction using the cylindrical lens.

The deflection unit 5 includes a polygonal-column-shaped polygon mirror in which a side surface is composed of a mirror surface, and a motor which provides a rotational torque to the polygon mirror to rotate the polygon mirror. The deflection unit 5 deflects the laser light L transmitted through the second optical system 4 to an orientation corresponding to the rotation. The deflection unit 5 then irradiates a circumferential surface of the photoreceptor 200 with the deflected laser light L via the third optical system 6. At this point, the deflection unit 5 irradiates a different position in a longitudinal direction of the photoreceptor 200 with the laser light L correspondingly to the rotation position, which allows the scan of the laser light L in a main scanning direction (in the longitudinal direction of the photoreceptor 200 in FIG. 2).

The third optical system 6 condenses the laser light L deflected by the deflection unit 5 onto the surface of the photoreceptor 200 to form an image. The third optical system 6 includes a plurality of optical elements 62 each of which condenses the laser light L to the surface of the photoreceptor 200, and each of the optical elements 62 is fixed and held by an optical element holder 61 (see FIG. 3).

The fourth optical system 7 includes a cylindrical lens. The fourth optical system 7 condenses part of the laser light L deflected by the deflection unit 5, and makes the condensed laser light L enter the sensor 8.

The sensor 8 is an optical sensor which detects the laser light L condensed by the fourth optical system 7. A control unit (not illustrated) of the image forming apparatus 1000 equipped with the laser scanning apparatus 100 adjusts timing for a write-start position of the photoreceptor 200 on the basis of a detection signal detected by the sensor 8.

(Configuration to Fix Optical Element 62 to Optical Element Holder 61)

A configuration to fix the optical element 62 to the optical element holder 61 will be described below with reference to FIGS. 3 to 7. For the sake of convenience, the optical element holder 61 and a cover 610 are illustrated by an alternate long and two short dashes line such that an internal structure of the optical element holder 61 is easily seen in FIGS. 3 and 4.

Figure 3:
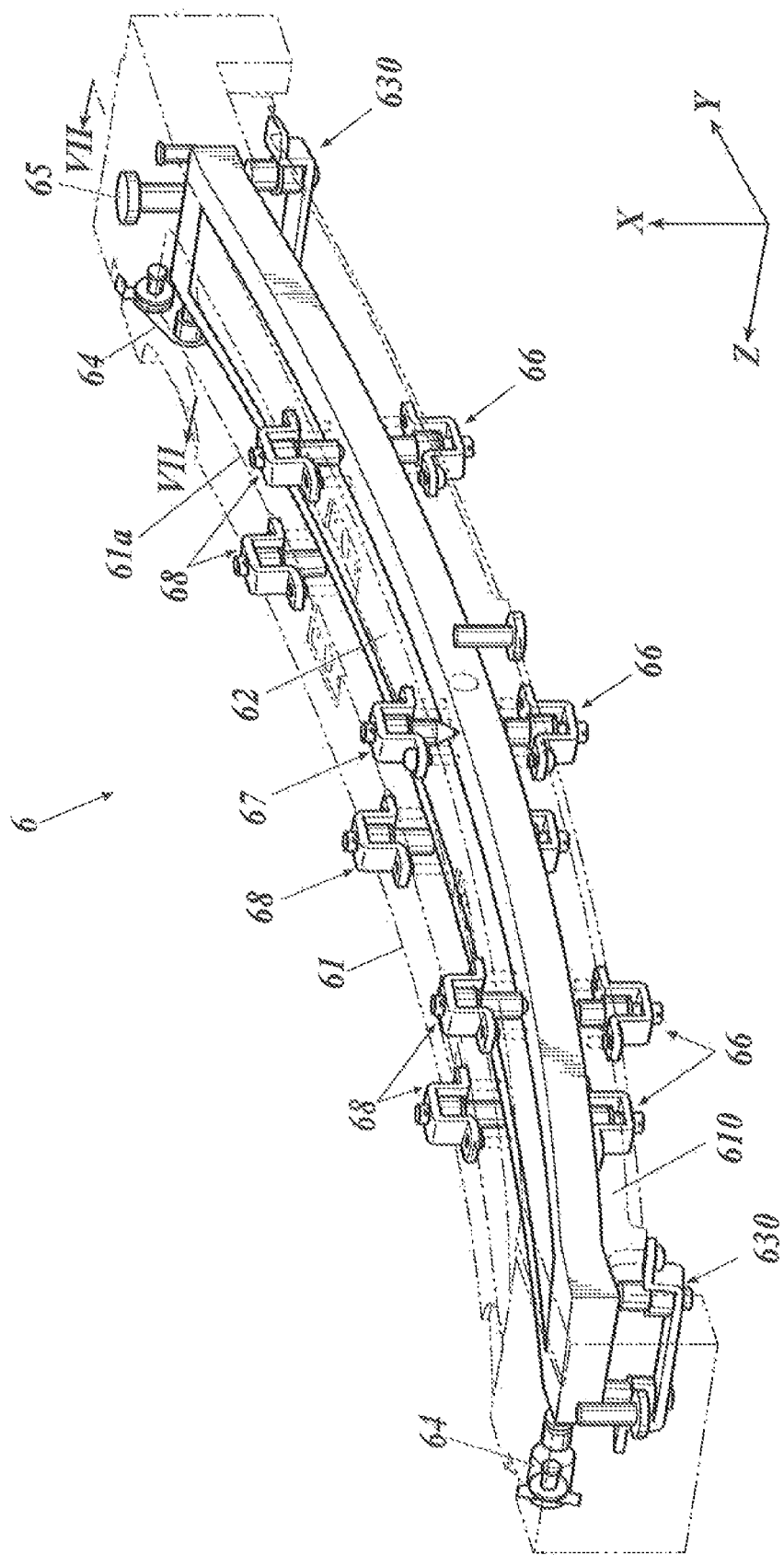
FIG. 3 is a perspective view illustrating an entire configuration of a third optical system according to the first embodiment.

Hereinafter, a longitudinal direction of the optical element holder 61 in FIG. 3 is defined as a Y-direction, a short-length (width) direction is defined as a Z-direction, and a direction orthogonal to both of the Y-direction and Z-direction is defined as an X-direction. In the third optical system 6 in FIG. 3, a side of the optical element 62 on which a first pressing pin 67 and a second pressing pin 68 are disposed is defined as an upper side, and an opposite side to the upper side is defined as a lower side. In the first embodiment, the laser light L enters the optical element 62 to transmit therethrough in the X-direction, namely, a vertical direction. In other words, the X-direction agrees with an optical axis direction of the laser light L.

As illustrated in FIG. 3, the optical element holder 61 is a substantially box-shaped member in which a lower side is opened, and elongated (long) in the Y-direction. The optical element holder 61 is formed into a shape slightly curved downward in the X-direction according to the shape of the optical element 62. A through-hole 61a elongated in the Y-direction is made in a substantially central portion in an upper surface of the optical element holder 61 to pierce through the optical element holder 61 in the X-direction, so that the laser light L can pass through the through-hole 61a. The optical element 62 is inserted in the optical element holder 61. The first pressing pin 67 is disposed in the central portion in the Y-direction of the upper surface of the optical element holder 61 for fixing the optical element holder 61 and the optical element 62 to each other. An X-pressing unit 630 which upwardly presses the optical element 62 in the X-direction and a Z-pressing unit 64 which presses the optical element 62 in a first direction (front direction in FIG. 3) in the Z-direction are disposed in both end portions in the Y-direction of the optical element holder 61. A Y-direction positioning pin 65 which positions the optical element 62 in the Y-direction is also disposed in an end portion in the Y-direction of the optical element holder 61.

Figure 4:
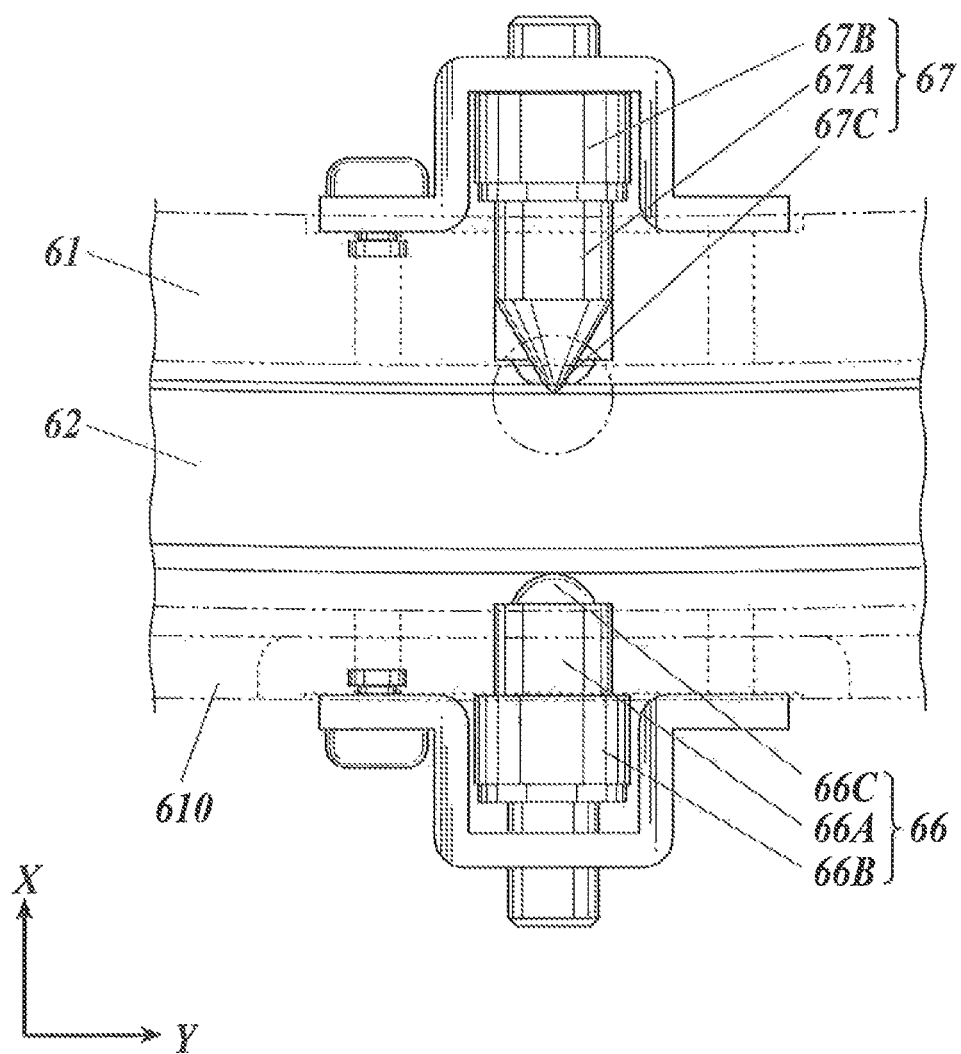
FIG. 4 is a side view illustrating a first pressing pin and an adjustment pin viewed from a Z-direction according to the first embodiment.

As illustrated in FIGS. 3 and 4, the cover 610 to support the optical element 62 so as to cover the optical element 62 from below is attached to the lower side of the optical element holder 61. A plurality of adjustment pins 66 which positions the optical element 62 in the X-direction is disposed in the cover 610, which allows the cover 610 and the optical element 62 to fix to each other.

The adjustment pin 66 includes an adjustment shaft 66A, a coil spring 66B, and a positioning ball 66C.

Specifically, the adjustment pin 66 is attached to the cover 610 using a sheet metal (not illustrated). The adjustment pin 66 is configured to be able to advance/retract in the X-direction by rotating the adjustment shaft 66A which has a male screw formed in a portion thereof. The adjustment shaft 66A is pressed from below in the X-direction by the coil spring 66B for suppressing engagement looseness of a screw portion. The positioning ball 66C is disposed at a tip of the adjustment shaft 66A, the tip pressing the optical element 62. The positioning ball 66C is a steel ball, for example, and moves according to the advance/retract in the X-direction of the adjustment shaft 66A with the rotation thereof. The positioning ball 66C is fitted into a counterbore provided in the tip of the adjustment shaft 66A with a loose fit (not illustrated), and lubricating grease is applied to the fitting portion such that the positioning ball 66C is rotatable. This embodiment uses the lubricating grease which does not provide a chemical attack against the optical element 62.

Figure 5:
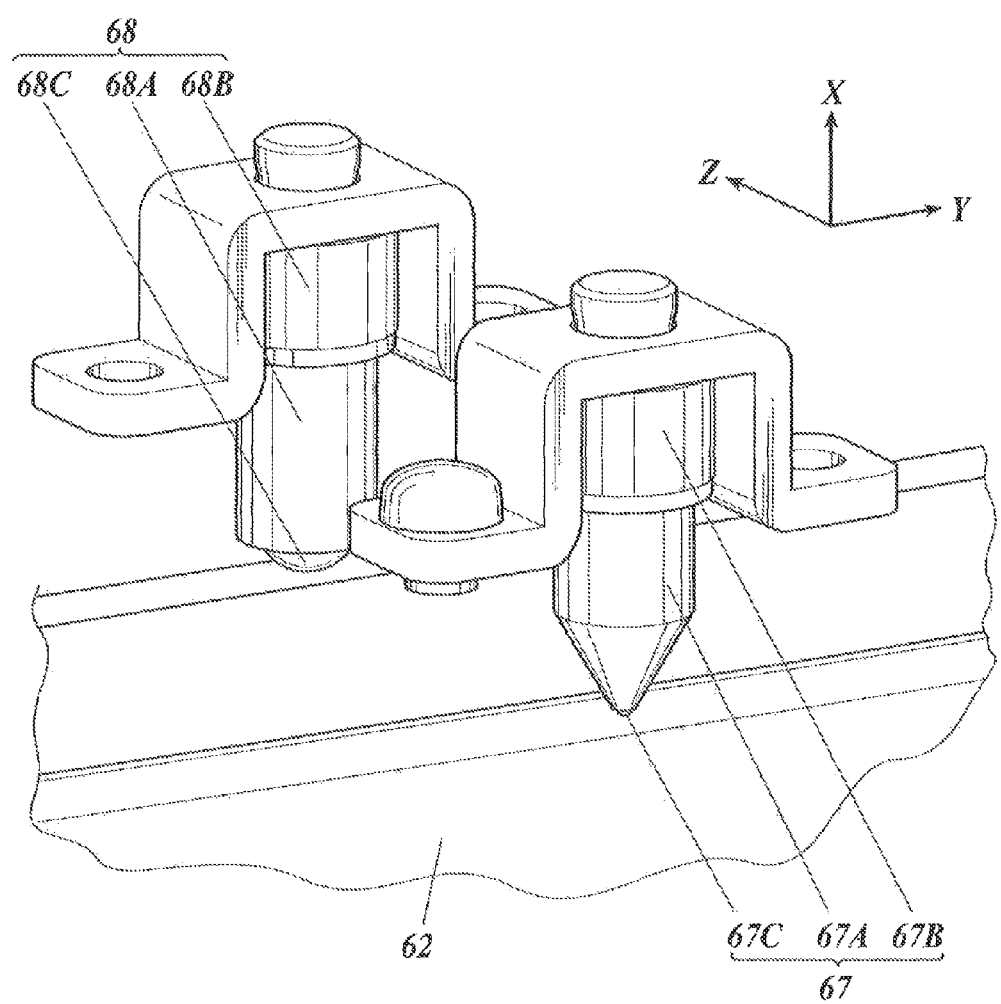
FIG. 5 is a perspective view illustrating configurations of the first and second pressing pins according to the first embodiment.

As illustrated in FIGS. 3 to 5, the optical element holder 61 includes the first pressing pin 67 and the plurality of second pressing pins 68 for positioning the optical element 62 in the Y-direction, which pins are disposed opposite to the adjustment pins 66 across the optical element 62. In the first embodiment, the optical element 62 is sandwiched in at least three positions with the first pressing pin 67, the plurality of second pressing pins 68, and the plurality of adjustment pins 66. The first pressing pin 67, the second pressing pins 68, and the adjustment pin 66 serve as the pressing members. The pressing members fix the optical element 62 in at least three positions on a surface orthogonal to an optical axis of the optical element 62.

The first pressing pin 67 includes a pressing shaft 67A and a coil spring 67B.

Specifically, the first pressing pin 67 is attached to the optical element holder 61 with a sheet metal (not illustrated) in the central portion in the Y-direction of the upper surface of the optical element 62. A portion of a shaft of the first pressing pin 67 is fitted into a hole made in the sheet metal (not illustrated), and the first pressing pin 67 can advance/retract in the X-direction. The pressing shaft 67A is always pressed from above in the X-direction by the coil spring 67B so that the optical element 62 is sandwiched by the pressing shaft 67A and adjustment pin 66.

The second pressing pin 68 includes a pressing shaft 68A and a coil spring 68B.

Specifically, similarly to the first pressing pin 67, the second pressing pin 68 is attached to the optical element holder 61 with the sheet metal (not illustrated) in the upper surface of the optical element 62. A portion of a shaft of the second pressing pin 68 is fitted into a hole made in the sheet metal (not illustrated), and the second pressing pin 68 can advance/retract in the X-direction. The pressing shaft 68A is always pressed from above in the X-direction by the coil spring 68B so that the optical element 62 is sandwiched by the pressing shaft 68A and adjustment pin 66.

As shown in this embodiment, preferably the first pressing pin 67 is disposed in the central portion in the Y-direction of the optical element 62. This is because a relative difference between the optical element holder 61 and the optical element 62 due to a linear expansion is produced in both directions in Y-direction, namely the longitudinal direction, while the central portion in the Y-direction is a base point of the linear expansion, and accordingly the above configuration makes an expansion/contraction amount of the optical element 62 minimum.

Figure 6A:
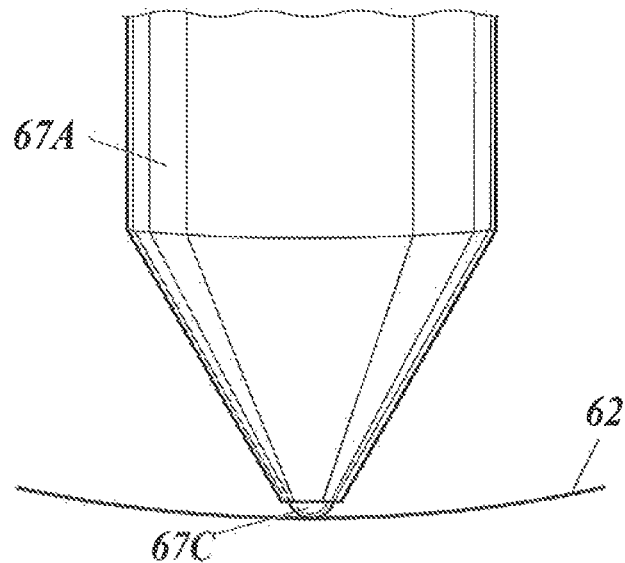
FIG. 6A is a diagram illustrating a configuration of a tip of the first pressing pin according to the first embodiment.
Figure 6B:
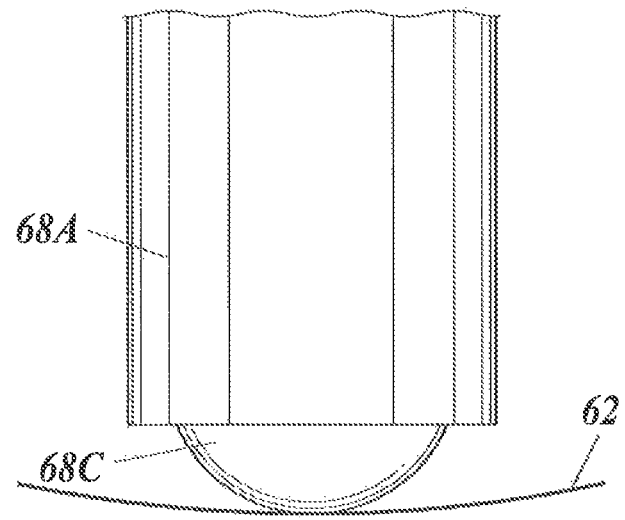
FIG. 6B is a diagram illustrating a configuration of a tip of the second pressing pin according to the first embodiment.

As illustrated in FIG. 6A, the first pressing pin 67 includes a tip 67C which is formed into a spherical shape and presses the optical element 62. A radius (or radius of curvature) R of the tip 67C is formed so as to be smaller than a radius (or radius of curvature) of the positioning ball 66C of the adjustment pin 66 or the tip 68C of the second pressing pin 68. Specifically, the tip 67C of the first pressing pin 67 has the radius R of 0.25 millimeters (a diameter of 0.5 millimeters). Meanwhile, as illustrated in FIG. 6B, the second pressing pin 68 includes a tip 68C which is formed into the spherical shape and presses the optical element 62, similarly to the first pressing pin 67. A radius R1 of the tip 68C is formed so as to be larger than the radius R of the first pressing pin 67. Specifically, the tip 68C of the second pressing pin 68 has the radius R1 of 1.6 millimeters (the diameter of 3.2 millimeters).

In the case that the optical element 62 is made of a resin material, when assuming that D is a diameter of the tip 67C, that A is an area of a depressed portion when the tip 67C presses down on the resin (the optical element 62), and that H is a depth of the depressed portion, a diameter D of the tip 67C can be expressed by Mathematical formula 1. (For Mathematical formula 1, see Japanese Patent Application Laid-open No. 2008-292234).

$$D = ((2/(3p)) \cdot (vA)^2 / H \qquad \text{[Mathematical formula 1]}$$

Assuming that Er is a complex Young's modulus of the resin and tip 67C, and that S is a proportionality coefficient, a relationship between the complex Young's modulus Er and the area A of the depressed portion can be expressed by Mathematical formula 2.

$$Er=((vp)/2)\cdot(S/(vA)) \quad \text{[Mathematical formula 2]}$$

Assuming that Es is a Young's modulus of the tip 67C, that vs is a Poisson ratio of the tip 67C, that Ei is a Young's modulus of the resin, and that vi is a Poisson ratio of the resin, the complex Young's modulus Er can be expressed by Mathematical formula 3.

$$Er=[(1-vs^2)/Es+(1-vi^2)/Ei])^{-1} \quad \text{[Mathematical formula 3]}$$

From Mathematical formulae 1 and 2, a relationship between the depth H of the depressed portion and the diameter D of the tip 67C can be expressed by Mathematical formula 4.

$$H=S^2/(6\cdot D\cdot Er^2) \quad \text{[Mathematical formula 4]}$$

From Mathematical formula 4, it is found that the depth H of the depressed portion is inversely proportional to $D\cdot Er^2$. Concretely, since the depth H of the depressed portion increases with decreasing the diameter D of the tip 67C, the tip 67C presses deeply down on the resin with decreasing radius R of the tip 67C.

Preferably the value of $D\cdot Er^2$ is about 45000.

In a pressing position where the first pressing pin 67 whose the tip 67C has the small radius R is pressed to the optical element 62, the optical element 62 is fixed while the first pressing pin 67 presses deeply down on the optical element 62. Accordingly, the relative positional difference between the optical element 62 and the optical element holder 61 holding the first pressing pin 67 is reduced.

In the case that the expansion/contraction of the optical element 62 occurs due to an environmental change, in a pressing position where the second pressing pin 68 whose tip 68C has the large radius is pressed to the optical element 62, the second pressing pin 68 does not press deeply down the optical element 62, and thereby a skid in the Y-direction of the optical element 62 occurs between the second pressing pin 68 and the optical element 62. Accordingly, the expansion/contraction of the optical element 62 is not interfered and a deformation of the optical element 62 is suppressed. On the other hand, the pressing position where the first pressing pin 67 whose tip 67C has the small radius is pressed on the optical element 62 always becomes the base point of the expansion/contraction of the optical element 62. Therefore, when the environmental temperature returns to a room temperature, the positional relationship between the optical element 62 and the optical element holder 61 returns to an original state with the pressing position as the base point. As described above, it becomes possible to hold the optical element 62 while dealing with the expansion/contraction due to the environmental change.

Concretely, in the first embodiment, the tip 67C of the first pressing pin 67 presses down on the optical element 62 more deeply than the tip 68C of the second pressing pin 68, which allows the optical element 62 to be held while dealing with the expansion/contraction due to the environmental change. Thus, the first pressing pin 67 serves as a base pressing member. A pressing amount of the tip 67C of the first pressing pin 67 as the base pressing member with respect to the optical element 62 is larger than the pressing amounts of other pressing members with respect to the optical element 62.

Next, a method for fixing the optical element 62 to the optical element holder 61 will be described below.

The method firstly inserts the optical element 62 in the optical element holder 61, and by pressing both end portions in the Y-direction of the optical element 62 with the X-pressing units 630 while pressing the optical element 62 to the Z-pressing units 64 and Y-direction positioning pin 65, positions the optical element 62. The X-pressing unit(s) 630 is provided at one or two positions in each end portion in the Y-direction of the optical element 62, and the optical element 62 is fixed at three points or more with the X-pressing unit(s) 630, and with the first pressing pin 67 provided in the central portion in the Y-direction of the optical element 62, thereby defining an attaching surface of the optical element 62 in the X-direction. Thus, fixing points of the optical element 62 in the X-direction may be provided at one position in one of the end portions in the Y-direction and the central portion in the Y-direction of the optical element 62, and provided at two positions in the other.

Figure 7:
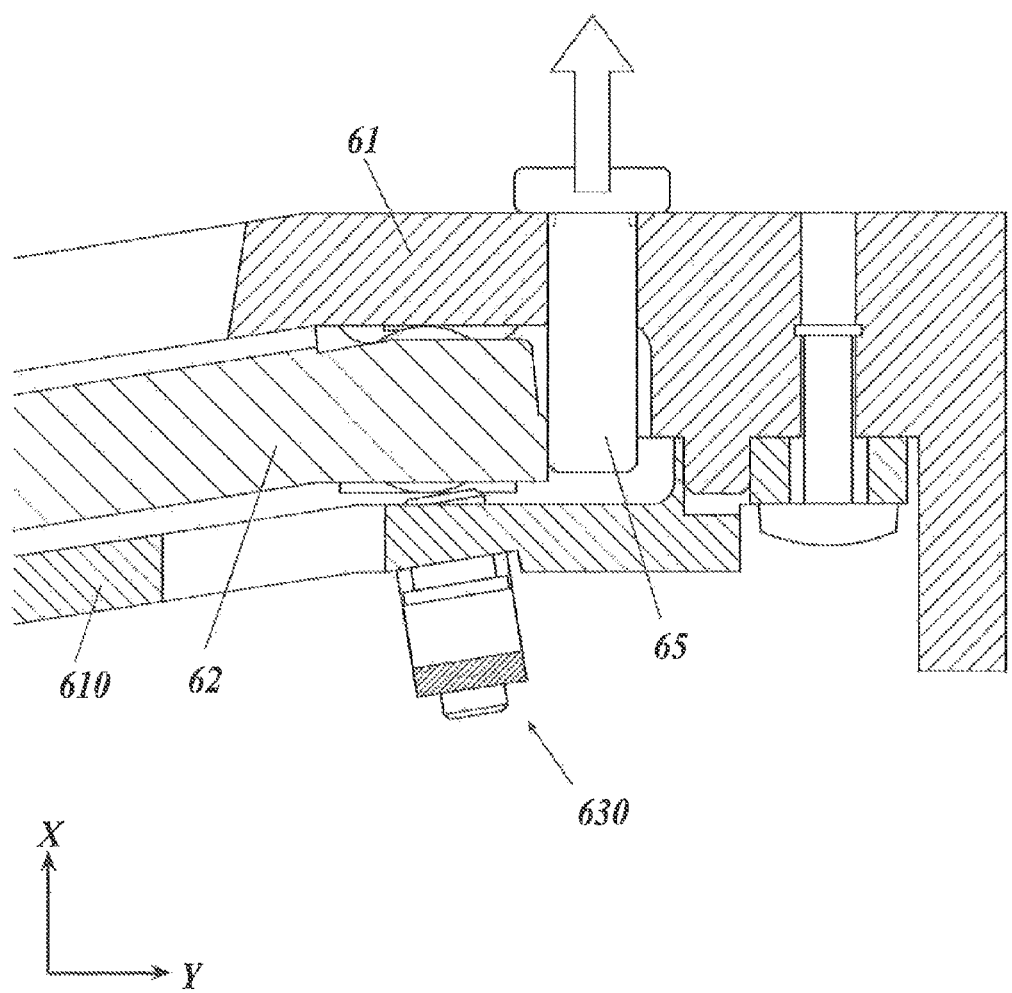
FIG. 7 is a sectional view taken along a line VII-VII in FIG. 3.

As illustrated in FIG. 7, the X-pressing units 630 disposed in both the end portions in the Y-direction of the optical element 62 supports the optical element 62 in the direction slightly inclined with respect to the vertical direction. This is effective in the case that the optical element 62 has the curved surface like the first embodiment, and the X-pressing unit 630 is externally inserted such that a normal line direction of the curved surface of the optical element 62 becomes the support direction of the X-pressing unit 630. Therefore, the optical element holder 61 can allow the optical element 62 freely expand/contract in an extending direction of the curved line of the curved surface when the expansion/contraction of the optical element 62 is generated by the difference in linear expansion between the optical element holder 61 and the optical element 62 due to the change in temperature or humidity, and thereby an optical surface which is of the curved surface is not excessively deformed.

After the optical element 62 is positioned, the cover 610 is attached from below in the X-direction of the optical element 62, and the central portion in the Y-direction of the optical element 62 is sandwiched by the adjustment pin 66 and the first pressing pin 67. In addition to the central portion in the Y-direction of the optical element 62, plural positions are sandwiched by the adjustment pins 66 and the second pressing pins 68. By supporting the optical element 62 at the plural positions except the central portion in the Y-direction, particularly at the positions in the Y-direction which is of the longitudinal direction, the number of positions to which the optical element 62 is fixed increases, so that the optical element 62 can more stably be fixed. An effect to suppress the deformation of the optical element 62 due to the environmental change can be expected as a pitch between the fixing points is narrowed. The Y-direction positioning pin 65 is pulled to be removed at a stage in which the adjustment pin 66 and the first pressing pin 67 are positioned and the optical element 62 is fixed.

The deformation due to mounting the optical element 62 on the optical element holder 61 is suppressed, because the stress in the X-direction and Y-direction is not applied to the optical element 62 until the optical element 62 is sandwiched between the adjustment pin 66 and the first pressing pin 67 after the cover 610 is attached. This is because the positioning is performed in the X-, Y-, and Z-directions by the minimum necessary pressing and is not regulated by a positioning projection unit and the like in the first embodiment. Thus, the deformation of the optical element 62 can largely be suppressed at the stage in which the optical element 62 is fixed.

When performing the operation to sandwich the optical element 62 between the adjustment pin 66 and the first pressing pin 67 or second pressing pin 68, by monitoring the state of the optical element 62 with a measuring machine (not illustrated), the state of the strain generated in the optical element 62 can accurately be monitored and the operation can be easily performed.

As described above, according to the laser scanning apparatus 100 of the first embodiment, the optical element 62 constituting the third optical system 6 is fixed to the optical element holder 61 which can hold the optical element 62, by being sandwiched at three positions or more with the plurality of pressing members (the first pressing pin 67, the second pressing pins 68, and the adjustment pins 66) which can advance/retract in the optical axis direction (the X-direction) of the laser light L. Moreover, among the pressing members, the tip 67C of the first pressing pin 67 presses down on the optical element 62, which pin 67 is disposed in the predetermined position in the longitudinal direction (the Y-direction) on a first surface (upper surface) in the optical axis direction of the optical element 62. Thus, the positional relationship between the optical element 62 and the optical element holder 61 is fixed, and the tip 67C of the first pressing pin 67 always becomes the base point of the expansion/contraction of the optical element 62. Accordingly, the expansion/contraction of the optical element 62 can smoothly be performed due to the environmental change, and the misalignment of the optical element 62 can largely be suppressed.

Particularly, according to the laser scanning apparatus 100 of the first embodiment, each of the tips of the pressing members is formed into the spherical shape, and the tip 67C of the first pressing pin 67 has the radius smaller than that of other pressing members (the second pressing pin 68 and the adjustment pin 66), so that the tip 67C of the first pressing pin 67 can press deeply down on the optical element 62. Accordingly, the expansion/contraction of the optical element 62 can smoothly be performed due to the environmental change, and the misalignment of the optical element 62 can largely be suppressed.

Furthermore, according to the laser scanning apparatus 100 of the first embodiment, the first pressing pin 67 is disposed in the central portion in the Y-direction of the upper surface of the optical element 62, and thereby the relative difference in linear expansion between the optical element holder 61 and the optical element 62 can be distributed in both the directions with the central portion in the Y-direction as the base point. Accordingly, the expansion/contraction amount of the optical element 62 can be minimized.

Although the first embodiment of the present invention is specifically described above, the first embodiment is not limited to the above, but various changes can be made without departing from the scope of the present invention.
(First Modification)

Figure 8:
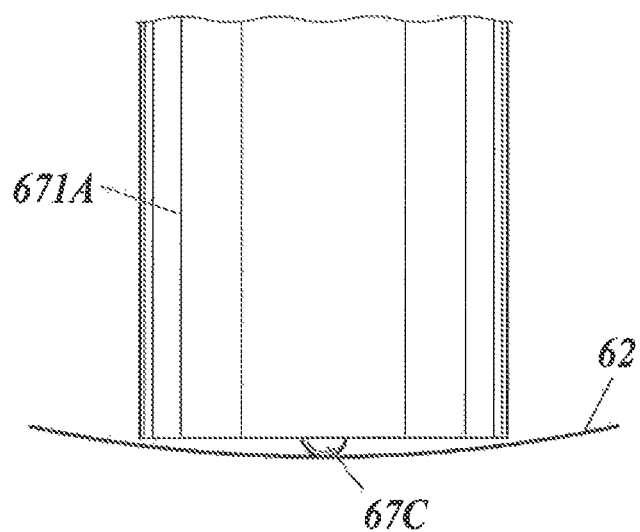
FIG. 8 is a diagram illustrating a configuration of a tip of a first pressing pin according to a first modification of the first embodiment.

Compared with the first embodiment, in an example shown in FIG. 8, the shape of the pressing shaft 67A differs from those of the pressing shafts of other pressing members, while the first tip 67C of the first pressing pin 67 has the same radius as those of the other pressing members. Specifically, the first pressing pin 67 of a first modification has a pressing shaft 671A which has a columnar shape.

In the case that the optical element 62 is formed into the curved shape, for example, possibly the pressing shaft 671A of the first pressing pin 67 of the first modification comes into contact with the optical element 62. For this reason, in the first modification, preferably the pressing shaft is formed into the shape in which the pressing shaft is narrowed toward the tip 67C similarly to the pressing shaft 67A in FIG. 6A.
(Second Modification)

Figure 9:
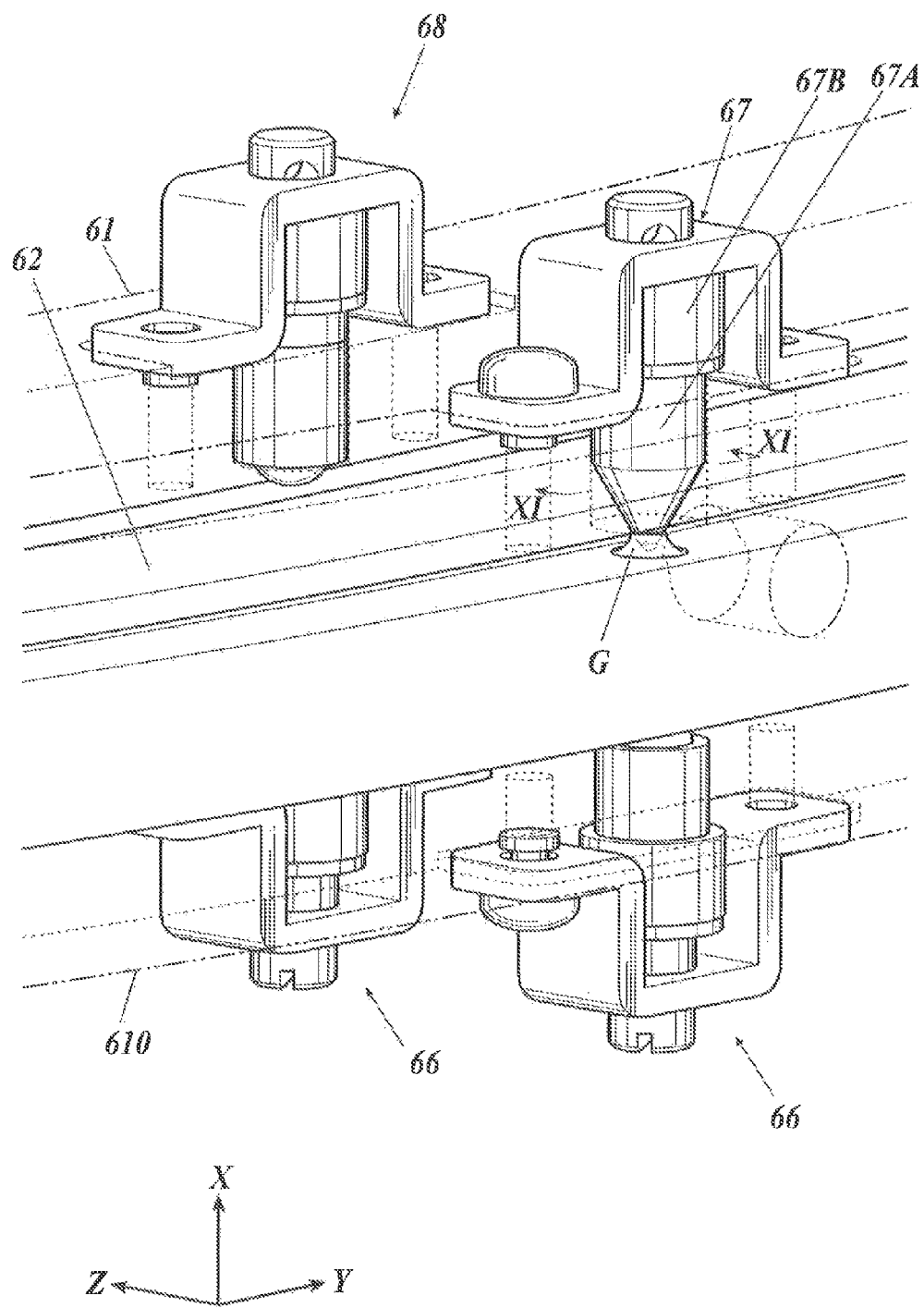
FIG. 9 is a perspective view illustrating a configuration of a first pressing pin according to a second modification of the first embodiment.
Figure 10:
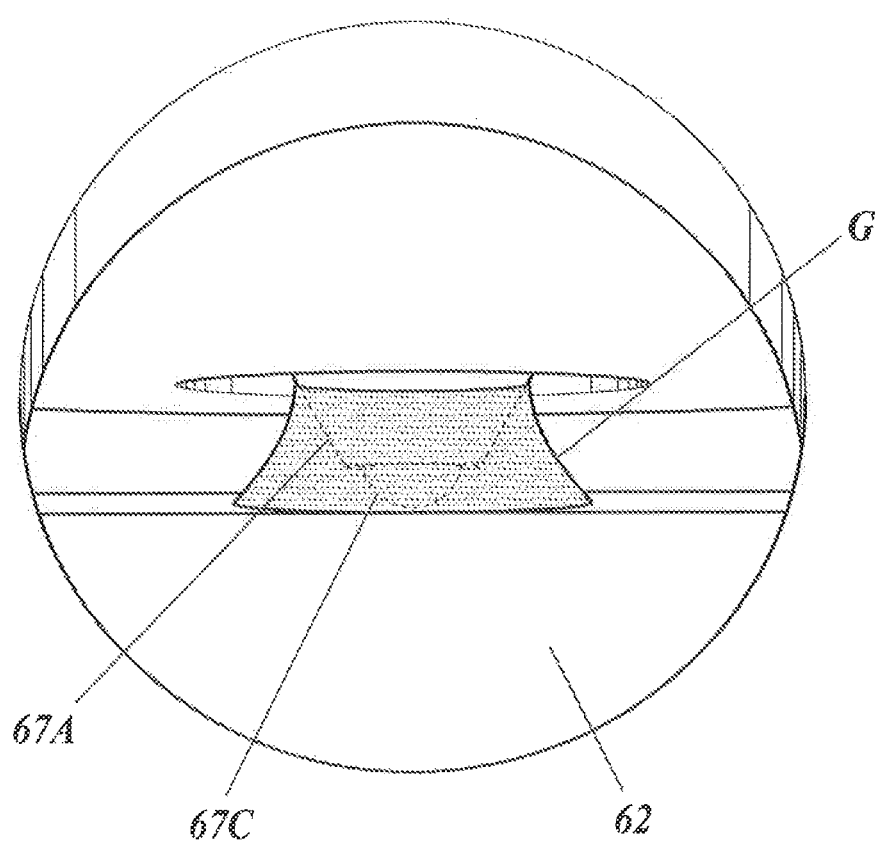
FIG. 10 is a diagram illustrating a configuration of a tip of the first pressing pin according to the second modification of the first embodiment.
Figure 11:
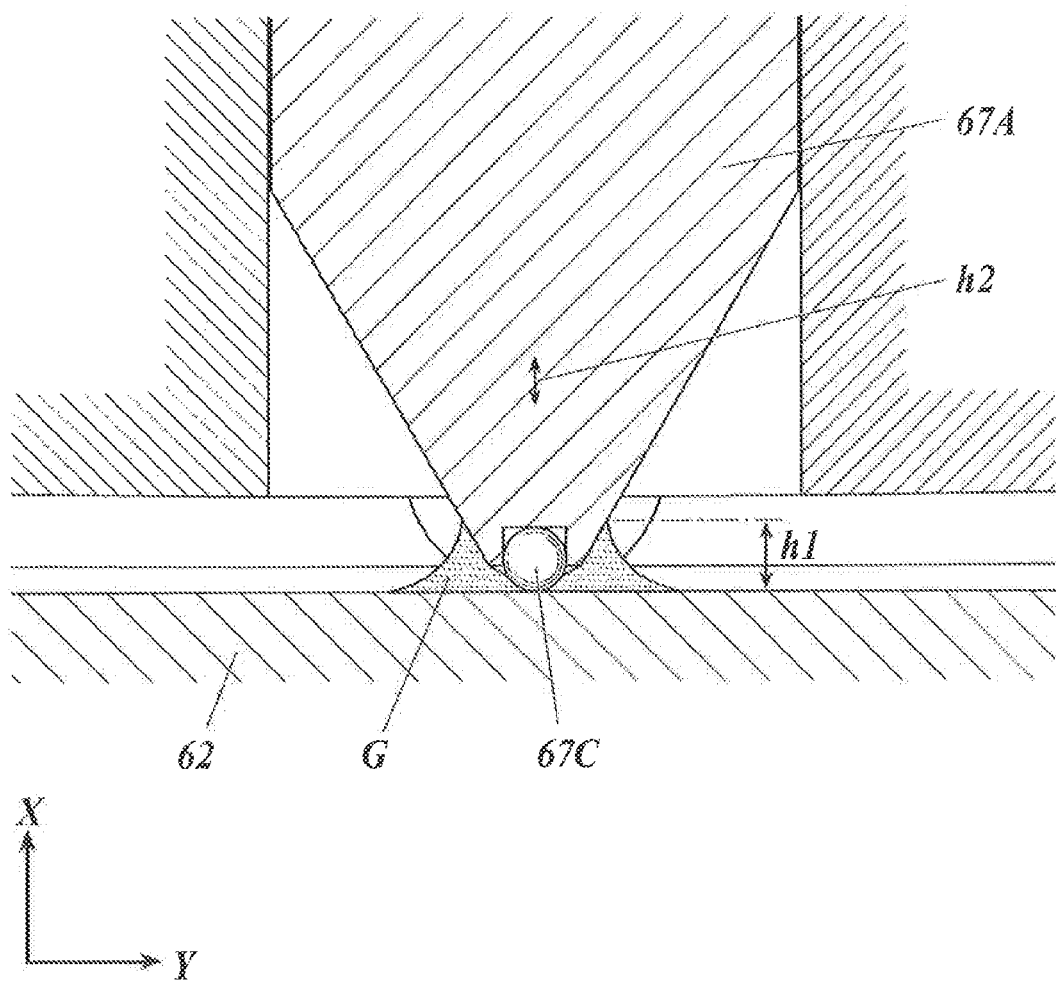
FIG. 11 is a sectional view illustrating an example of portion taken along a line XI-XI in FIG. 9.

An example shown in FIGS. 9 to 11 differs from the first embodiment in that an ultraviolet curing adhesive G is applied to the pressing position where the first pressing pin 67 is pressed to the optical element 62 so as to strengthen a positioning strength of the optical element 62.

The first pressing pin 67 according to a second modification has the tip 67C whose radius is smaller than that of the second pressing pin 68, and presses more deeply down on the optical element 62. Additionally, the misalignment of the optical element 62 is suppressed by cure shrinkage of the ultraviolet curing adhesive G applied to the pressing position where the first pressing pin 67 is pressed to the optical element 62, so that the first pressing pin 67 can more accurately be fixed to the optical element 62.

By increasing an application amount of the ultraviolet curing adhesive G, as illustrated in FIG. 11, a height h1 of the ultraviolet curing adhesive G applied to the pressing position of the first pressing pin 67 on the optical element 62 is increased. Sometimes the optical element 62 bounces inside the optical element holder 61 due to a shock generated by a drop of the optical element holder 61, and the first pressing pin 67 separates temporarily from the optical element 62 to relatively deviate the position of the optical element 62. Even in such case, the first pressing pin 67 hardly climbs over the highly-mounded ultraviolet curing adhesive G, and fixation of the optical element 62 having an excellent shock resistance can be achieved.

Thus, even when the first pressing pin 67 separates temporarily from the optical element 62, by mounding the ultraviolet curing adhesive G so that the height h1 of the adhesive G becomes more than or equal to a distance h2, within which distance h2 the first pressing pin 67 can separate from the optical element 62 from the state that the first pressing pin 67 is pressed to the optical element 62, the optical element 62 can retain the original position.

From the structural viewpoint, an adhesive force between the first pressing pin 67 and the ultraviolet curing adhesive G is smaller than that between the optical element 62 and the ultraviolet curing adhesive G because the first pressing pin 67 has the shape in which the first pressing pin 67 is thinned toward the tip 67C of the pressing shaft 67A. However, because an substantially same external shape of the first pressing pin 67 remains in the ultraviolet curing adhesive G in the case that the first pressing pin 67 separates temporarily from the optical element 62, the first pressing pin 67 comes into close contact with the ultraviolet curing adhesive G along the shape remaining in the ultraviolet curing adhesive G when the first pressing pin 67 presses the optical element 62 again. Thus, the positional relationship between the first pressing pin 67 and the optical element 62 returns to the original, so that a resistance to the drop shock can be improved.

As described above, according to the laser scanning apparatus 100 of the second modification, the ultraviolet curing adhesive G is applied to the pressing position where the tip 67C of the first pressing pin 67 is pressed to the optical element 62 with the height h1 greater than or equal to the distance within which the first pressing pin 67 can separate from the optical element 62. Therefore, even when the first pressing pin 67 separates temporarily from the optical element 62 to relatively deviate the position of the optical element 62, the tip 67C of the first pressing pin 67 cannot climb over the highly-mounded ultraviolet curing adhesive G, but the optical element 62 can be maintained at the original position in a steady state.
(Third Modification)

Figure 12:
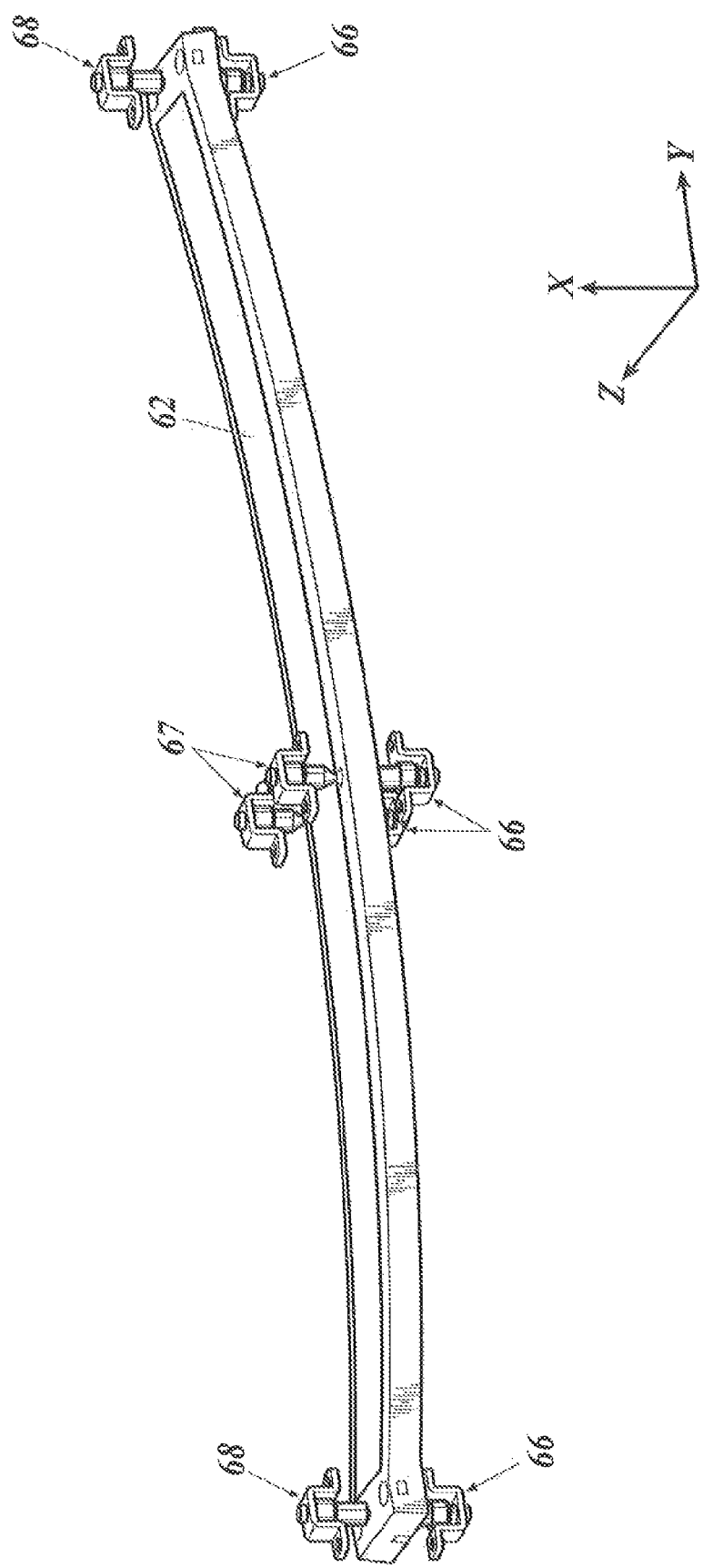
FIG. 12 is a perspective view illustrating configurations of first and second pressing pins according to a third modification of the first embodiment.

An example shown in FIG. 12 differs from the first embodiment in that a plurality of first pressing pins 67 each of which includes the tip 67C having the small radius are arrayed in the Z-direction, namely, the short-length direction of the optical element 62. In FIG. 12, the optical element holder 61 and the cover 610 are not illustrated for the sake of convenience.

Specifically, two first pressing pins 67 each of which includes the tip 67C having a relatively small radius are arrayed in the Z-direction of the optical element 62, and the one (1) second pressing pin 68 whose tip 68C has a relatively large radius is disposed in each of both end portions in the Y-direction of the optical element 62. Therefore, the plurality of fixing points, at each of which the relative positional relationship between the optical element 62 and the optical element holder 61 is fixed by the first pressing pin 67, is provided in the Z-direction of the optical element 62, so that the optical element 62 can more strongly be fixed. When providing the plurality of fixing points in the Z-direction of the optical element 62, the optical element 62 is affected by the difference in linear expansion coefficient between the optical element holder 61 and the optical element 62. However, the influence is sufficiently small compared with the case that the plurality of fixing points is provided in the Y-direction, and the influence can be omitted.

According to the laser scanning apparatus 100 of the third modification, the first pressing pins 67 are arrayed in the short-length direction (the Z-direction), so that the fixing points at each of which the relative positional relationship between the optical element 62 and the optical element holder 61 is fixed by the first pressing pin 67 are provided in the Z-direction of the optical element 62. Accordingly, the optical element 62 is more strongly fixed.

(Other Modifications)

Although only the first pressing pin 67 is configured to have the small radius among the pressing pins (the first pressing pin 67 and the second pressing pin 68), the configuration is not limited to the above. For example, one of the adjustment pins 66 may be formed as the adjustment pin 66 having a small radius. In this case, however, possibly the pressing amount of the adjustment pin 66 increases with time when the tip of the adjustment pin 66 has the small radius, namely, has the shape in which the adjustment pin 66 presses down on the optical element 62. When the pressing amount increases excessively, there is a possibility that the optical element 62 moves in the pressing direction of the adjustment pin 66. Accordingly, similarly to the first embodiment, preferably the first pressing pin 67 is configured as only the pressing pin having a small radius.

The adjustment pin 66 may be disposed on the upper surface of the optical element 62 while the first pressing pin 67 and the second pressing pin 68 may be disposed on the lower surface of the optical element 62.

Additionally, a detailed configuration and a detailed operation of each device constituting the laser scanning apparatus and image forming apparatus may properly be changed without departing from the scope of the first embodiment.

A second embodiment of the present invention will be described below with reference to the drawings.

(Configuration to Fix Optical Element 62 by Optical Element Holder 61)

A configuration of the second embodiment in which the optical element 62 is fixed by the optical element holder 61 will be described below with reference to FIGS. 13 to 15. For the sake of convenience, the optical element holder 61 is illustrated by the alternate long and two short dashes line in FIGS. 13 to 15 such that the internal structure of the optical element holder 61 is easily seen.

Figure 13:
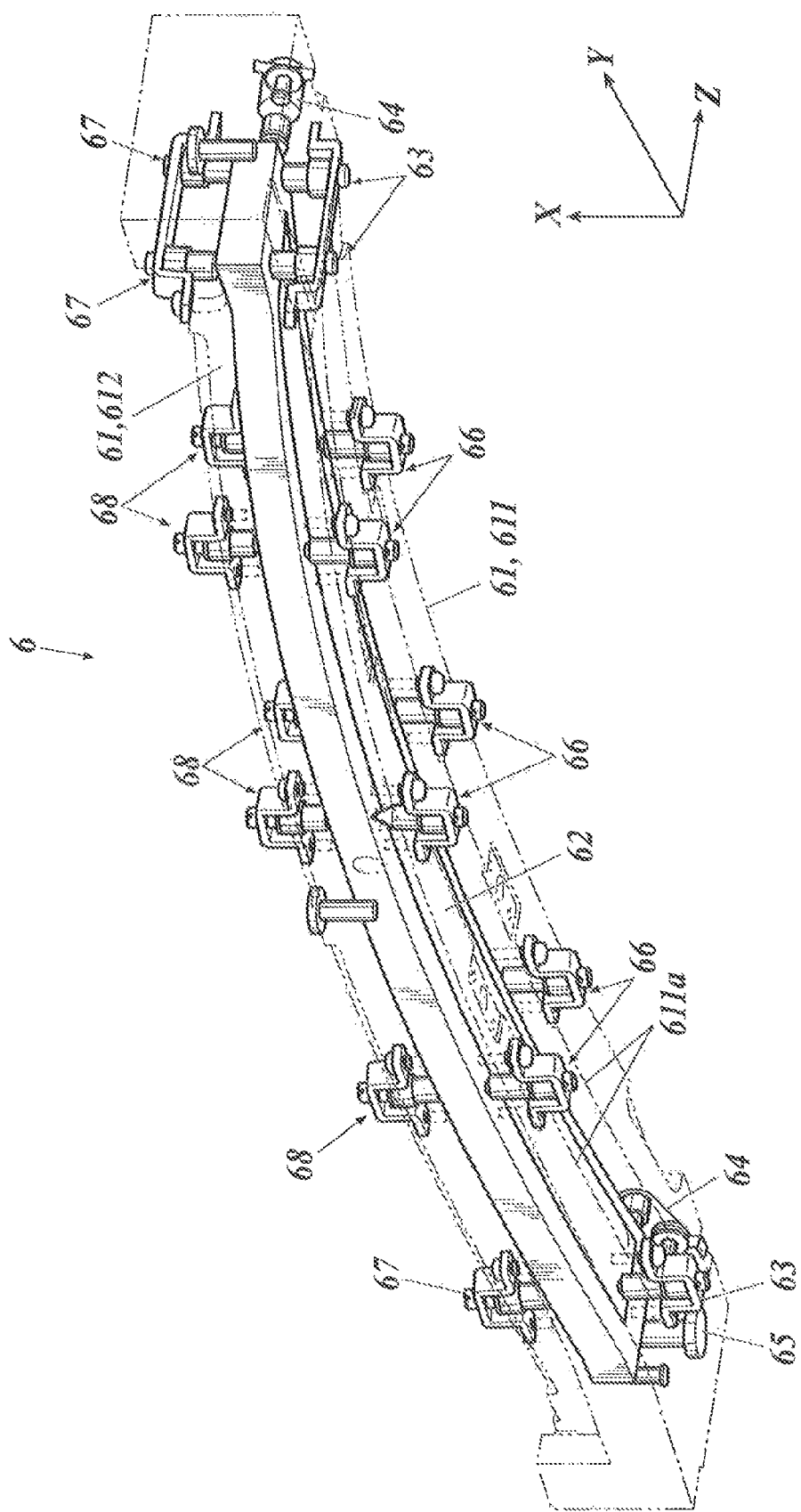
FIG. 13 is a perspective view illustrating an entire configuration of a third optical system according to a second embodiment.
Figure 16:
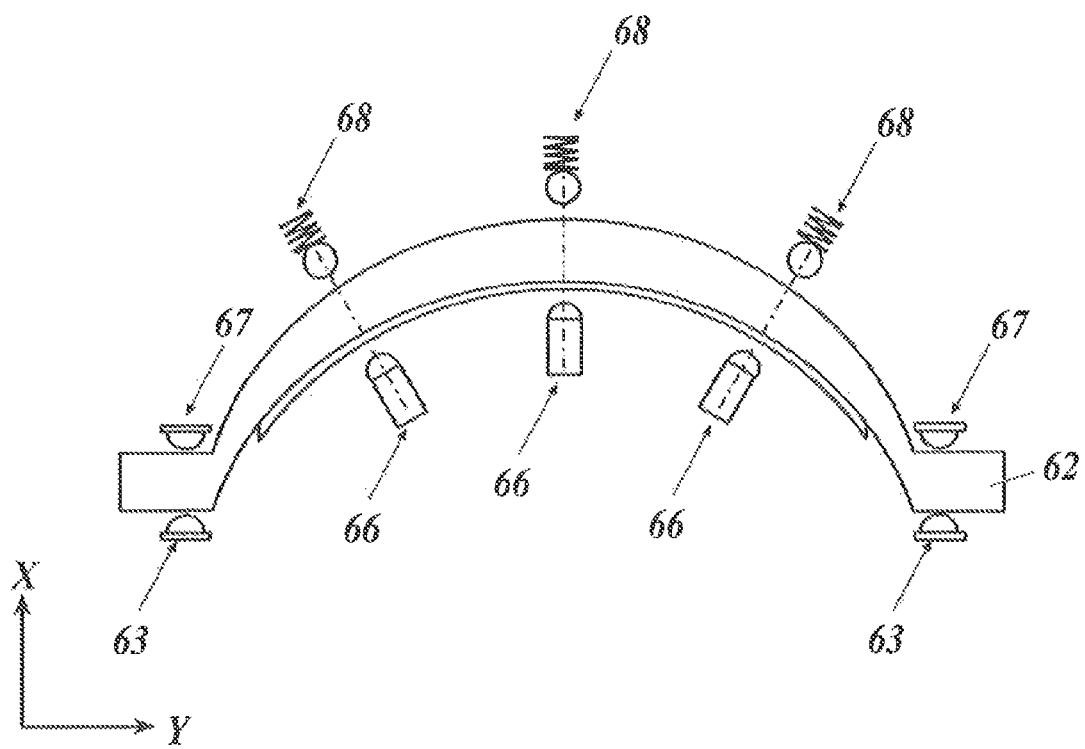
FIG. 16 is a side view schematically illustrating a state in which both the adjustment pins and the second pressing pins retract.

Hereinafter, the longitudinal direction of the optical element holder 61 in FIG. 13 is defined as the Y-direction, the short-length direction is defined as the Z-direction, and the direction orthogonal to the Y-direction and Z-direction is defined as the X-direction. In the third optical system 6 shown in FIG. 13, the side on which the after-mentioned first pressing pin 67 and the second pressing pin 68 are disposed is defined as the upper side, and the opposite side to the upper side is defined as the lower side. In the second embodiment, the laser light L enters the optical element 62 to transmit therethrough in the X-direction, namely, the vertical direction. In other words, the X-direction agrees with the optical axis direction of the laser light L.

As illustrated in FIG. 13, the optical element holder 61 includes: an optical element case 611 which is composed of a substantially box-shaped member whose upper side is opened, and which is elongated in the Y-direction; and an optical element cover 612 which is composed of a substantially lid-like member to cover the upper side of the optical element case 611 from above, so that the optical element 62 can be inserted in the optical element holder 61 and held by the same. The optical element case 611 and the optical element cover 612 are formed into the shape slightly curved upward in the X-direction according to the shape of the optical element 62 inserted in the optical element holder 61.

In one or both of the end portions in the Y-direction of the optical element holder 611, the holding pins (the holding members) 63 which hold the optical element 62 from below in the X-direction, the Z-pressing units 64 which press the optical element 62 in a first direction (front direction in FIG. 13) in the Z-direction, and the Y-direction positioning pin 65 which positions the optical element 62 in the Y-direction are disposed. A through-hole 611a elongated in the Y-direction is made in the substantial center in the Z-direction of the lower surface of the optical element holder 611 so as to pierce through the optical element holder 611 in the X-direction, and the laser light L can pass through the through-hole 611a. In each of the end portions in the Z-direction of the lower surface of the optical element case 611, a plurality (three in FIG. 3) of adjustment pins (adjustment members) 66 which supports the optical element 62 from below in the X-direction are disposed along the Y-direction. As illustrated in FIG. 13, the adjustment pins 66 are disposed in a plurality of column lines (two lines in FIG. 13) with respect to the short-length direction (the Z-direction) of the optical element 62.

As illustrated in FIGS. 14A and 14B, the adjustment pin 66 includes: a cylindrical unit 661 which is formed into a cylindrical shape on a first end (upper end in FIGS. 14A and 14B); a held unit 662 which is formed into a cylindrical shape a second end (lower end in FIGS. 14A and 14B); a partition unit 663 which is provided along a boundary between the cylindrical unit 661 and the held unit 662 so as to partition the cylindrical unit 661 and the held unit 662; and a compression coil spring 664 which is provided on an outer peripheral surface of the cylindrical unit 661. The optical element 62 can be supported by inserting the adjustment pin 66 in the insertion hole 611b, which pierces through the optical element case 611 in the X-direction, from the lower side.

A pressing portion 661a formed into the spherical shape is provided on the upper surface of the cylindrical unit 661, and the pressing portion 661a presses the optical element 62.

A male screw is formed in the outer peripheral surface of the held unit 662, and a cross-shaped thread groove 662a is formed in the lower surface of the held unit 662.

The partition unit 663 has a disc shape. Compared with the cylindrical unit 661 and the held unit 662, a diameter of the partition unit 663 is lengthened such that the partition unit 663 projects in a YZ plane orthogonal to the longitudinal direction (the X-direction in FIGS. 14A and 14B).

A first end of the compression coil spring 664 presses the lower surface of the optical element case 611 while a second end of the compression coil spring 664 presses the upper surface of the partition unit 663. The compression coil spring 664 is spirally wound around the outer circumferential surface of the cylindrical unit 661. The compression coil spring 664 presses downward an adjustment pin holder 665 in the longitudinal direction for suppressing engagement looseness between the held unit 662 and the adjustment pin holder 665.

The adjustment pin 66 is held in the optical element case 611 with the adjustment pin holder 665.

The adjustment pin holder 665 is a plate-like member, and includes a holding unit 665a formed into a substantial U-shape. The adjustment pin holder 665 includes a receiving space in which the adjustment pin 66 can be received and is configured to hold the adjustment pin 66. The adjustment pin holder 665 is elongated in the longitudinal direction (the Y-direction in FIGS. 14A and 14B) of the optical element case 611, and both end portions in the longitudinal direction of the adjustment pin holder 665 are fixed to the optical element case 611 by setscrews 665b.

A circular hole 665c having the substantially same diameter as the held unit 662 of the adjustment pin 66 is made in the substantial central portion of the holding unit 665a. The adjustment pin 66 can be held by inserting the held unit 662 in the circular hole 665c.

A female screw which engages the male screw formed in the outer peripheral surface of the held unit 662 is formed in an inner peripheral surface of the circular hole 665c. The adjustment pin 66 advances/retracts in the longitudinal direction by rotating the adjustment pin 66 with the longitudinal direction (X-direction in FIGS. 14A and 14B) of the adjustment pin 66 as a rotating axis. FIG. 14A illustrates the state in which the adjustment pin 66 retracts from the pre-adjustment optical element 62. In FIG. 14A, the numeral M1 designates a gap between the pressing portion 661a of the adjustment pin 66 and the optical element 62. FIG. 14B illustrates the state in which the adjustment pin 66 is rotated to move upward in the longitudinal direction and the pressing portion 661a of the adjustment pin 66 presses on the optical element 62.

Thus, the adjustment pin 66 is configured to be able to be held in the state in which the adjustment pin 66 retracts from the optical element 62. The adjustment pin 66 moves in the direction in which the adjustment pin 66 presses the optical element 62 from the retract state, and the adjustment pin 66 presses the optical element 62 to serve as the adjustment member which adjusts the holding position of the optical element 62.

In both end portions in the Y-direction of the optical element cover 612, the first pressing pins 67 which press and fix the optical element 62 from above in the X-direction are disposed at respective positions opposite to the corresponding holding pins 63 across the optical element 62. In both end portions with respect to the Z-direction in the upper surface of the optical element cover 612, the plurality of second pressing pins (pressing members) 68 which presses and fixes the optical element 62 from above in the X-direction is disposed at the respective positions opposite to the corresponding adjustment pins 66 across the optical element 62.

As illustrated in FIGS. 14A, 14B and 15, the second pressing pin 68 includes: a cylindrical unit 681 which is formed into a cylindrical shape on a first end (lower end in the drawings); a held unit 682 which is formed on a second end (upper end in the drawings) and held by a second pressing pin holder 685, which is the fixing structure to fix the second pressing pin 68 while the second pressing pin 68 is in the retracting state; a partition unit 683 which is provided along the boundary between the cylindrical unit 681 and the held unit 682 so as to partition the cylindrical unit 681 and the held unit 682; and a compression coil spring 684 which is provided on the outer peripheral surface of the held unit 682. The optical element 62 can be pressed and fixed by inserting the second pressing pin 68 in the insertion hole 612b, which pierces through the optical element cover 612 in the X-direction, from the upper side.

A pressing portion 681a formed into the spherical shape is provided on the lower surface of the cylindrical unit 681, and the pressing portion 681a presses the optical element 62. In the second embodiment, the radius of the pressing portion 681a formed into the spherical shape is equal to that of the pressing portion 661a of the adjustment pin 66. In other words, in each of the adjustment pin 66 and the second pressing pin 68, an end which presses the optical element 62 is formed into the spherical shape having the same diameter.

The held unit 682 is formed into the cylindrical shape, and held by the second pressing pin holder 685 described later. In the vicinity of an upper end (the end which does not press the optical element 62) of the held unit 682, a through-hole 682a (a lock-pin insertion hole) which pierces through the second pressing pin 68 in a direction perpendicular to the longitudinal direction (the X-direction in the drawings) of the second pressing pin 68 is made.

The partition unit 683 has the disc shape. Compared with the cylindrical unit 681 and the held unit 682, the diameter of the partition unit 683 is lengthened such that the partition unit 683 projects in the YZ plane orthogonal to the longitudinal direction (the X-direction in the drawings).

A first end of the compression coil spring 684 presses the lower surface of a holding unit 685a of the second pressing pin holder 685 described later, while a second end of the compression coil spring 684 presses the upper surface of the partition unit 683. The compression coil spring 684 is spirally wound around the outer circumferential surface of the held unit 682. The compression coil spring 684 downwardly presses the second pressing pin 68 in the longitudinal direction to generate the pressing force for pressing the optical element 62.

The second pressing pin 68 is held in the optical element cover 612 by the second pressing pin holder (the pressing member holder) 685.

The second pressing pin holder 685 is the plate-like member, and includes the holding unit 685a which is formed into the substantial U-shape. The second pressing pin holder 685 includes the receiving space in which the second pressing pin 68 can be received and is configured to hold the second pressing pin 68. The second pressing pin holder 685 is elongated in the longitudinal direction (the Y-direction in the drawings) of the optical element cover 612, and both end portions in the longitudinal direction of the second pressing pin holder 685 are fixed to the optical element cover 612 by setscrews 685b.

A circular hole (the pressing member insertion hole) 685c having the substantially same diameter as the held unit 682 of the second pressing pin 68 is made in the substantially central portion of the holding unit 685a. The second pressing pin 68 can be held by inserting a circular hole 685c in the held unit 682.

In the second embodiment, as illustrated in FIGS. 14A and 15A, a lock pin 686 composed of a rod-shape member having the substantially same diameter as the insertion hole 682a is inserted in the insertion hole 682a, while the insertion hole 682a of the held unit 682 is located above the second pressing pin holder 685, which allows the second pressing pin 68 to be fixed while the second pressing pin 68 retracts from the optical element 62. In FIG. 14A, the numeral L1 designates a gap between the pressing portion 681a of the second pressing pin 68 and the optical element 62.

As illustrated in FIGS. 14B and 15B, by pulling out the lock pin 686 inserted in the insertion hole 682a, the second pressing pin 68 is downwardly lowered in the longitudinal direction, and the second pressing pin 68 can press the optical element 62. As a method for pulling the lock pin 686 from the second pressing pin 68, a method for pinching or nipping a first end of the lock pin 686 by fingers or a nipper to pull out the lock pin 686 can be cited as an example.

In other words, the second pressing pins 68 are configured to be able to be held at the positions opposite to the corresponding adjustment pins 66 across the optical element 62 while retracting from the optical element 62, and move in the direction in which the second pressing pins 68 press the optical element 62 from the retract state to serve as the pressing members to press the optical element 62.

Next, a method for fixing the optical element 62 to the optical element holder 61 will be described below with reference to FIGS. 13 to 21. For the sake of convenience, in FIGS. 16 to 21, the optical element holder 61 is not illustrated such that the state in which the optical element 62 is fixed by the adjustment pin 66 and second pressing pin 68 is easily seen.

Figure 17:
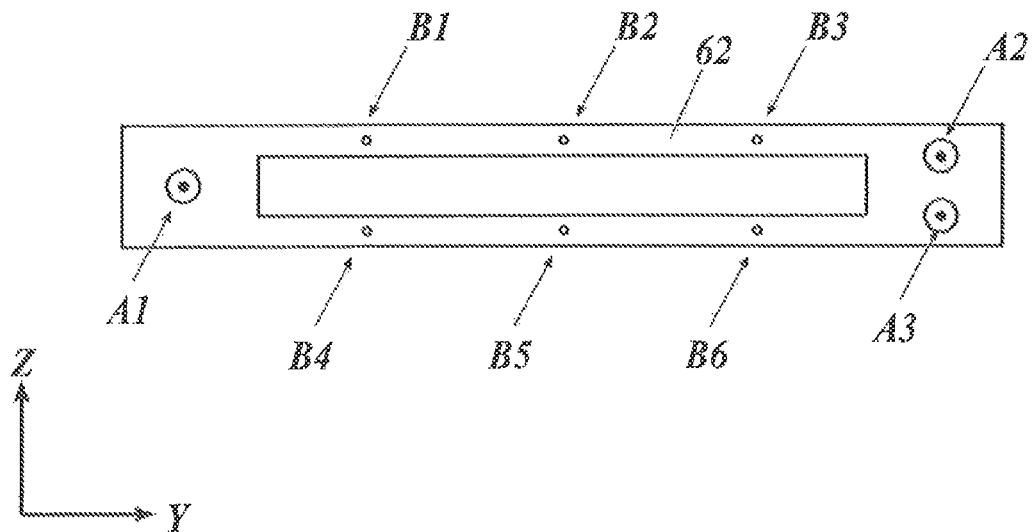
FIG. 17 is a bottom view illustrating positions where holding pins or the adjustment pins are disposed on an optical element.

The method firstly inserts the optical element 62 in the optical element case 611 to mount the optical element 62 to the optical element case 611. Then, the method presses the optical element 62 to the Z-pressing units 64 and Y-direction positioning pin 65 to position the optical element 62. Both end portions in the Y-direction of the optical element 62 are held by the holding pins 63. As illustrated in FIGS. 13 and 17, the three holding pins 63 are disposed so as to hold one (1) position in a first end portion (the left end portion in the drawings) in the Y-direction of the optical element 62 and two positions in a second end portion (the right end portion in the drawings) in the Y-direction. An attaching surface of the optical element 62 in the X-direction is defined by holding the optical element 62 at three points (A1 to A3 in the drawings). Thus, the holding pins 63 position the optical element 62 at three points with respect to the optical element case 611 of the optical element holder 61.

After the optical element 62 is held by the holding pin 63, the optical element cover 612 is attached from above in the X-direction of the optical element 62. In both end portions in the Y-direction of the optical element 62, the positions opposite to the holding pins 63 are pressed and fixed by the first pressing pins 67. Concretely, the first pressing pins 67 press and fix the optical element 62 at three points, namely, one (1) position in the first end portion in the Y-direction of the optical element 62 and two positions in the second end portion in the Y-direction to position the optical element 62 at three points with respect to the optical element holder 61. At this point, the adjustment pin 66 and the second pressing pin 68 are fixed while retracting from the optical element 62 (see FIG. 16).

Figure 18:
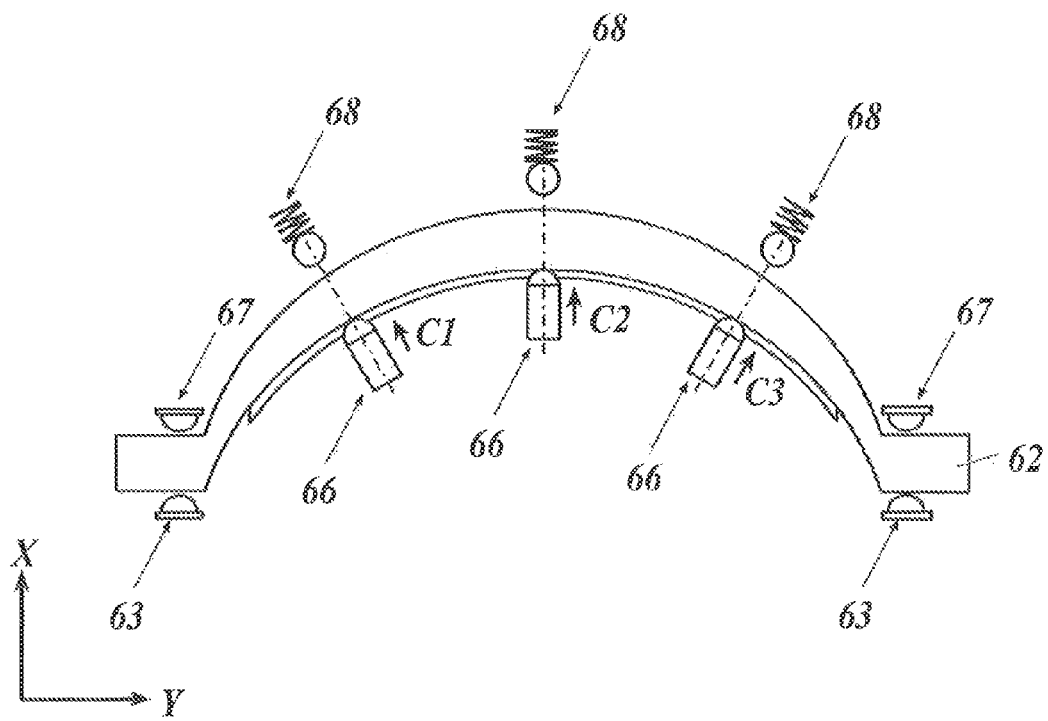
FIG. 18 is a side view schematically illustrating the adjustment pins which has come into a state of abutting on the optical element from the state shown in FIG. 16.
Figure 19:
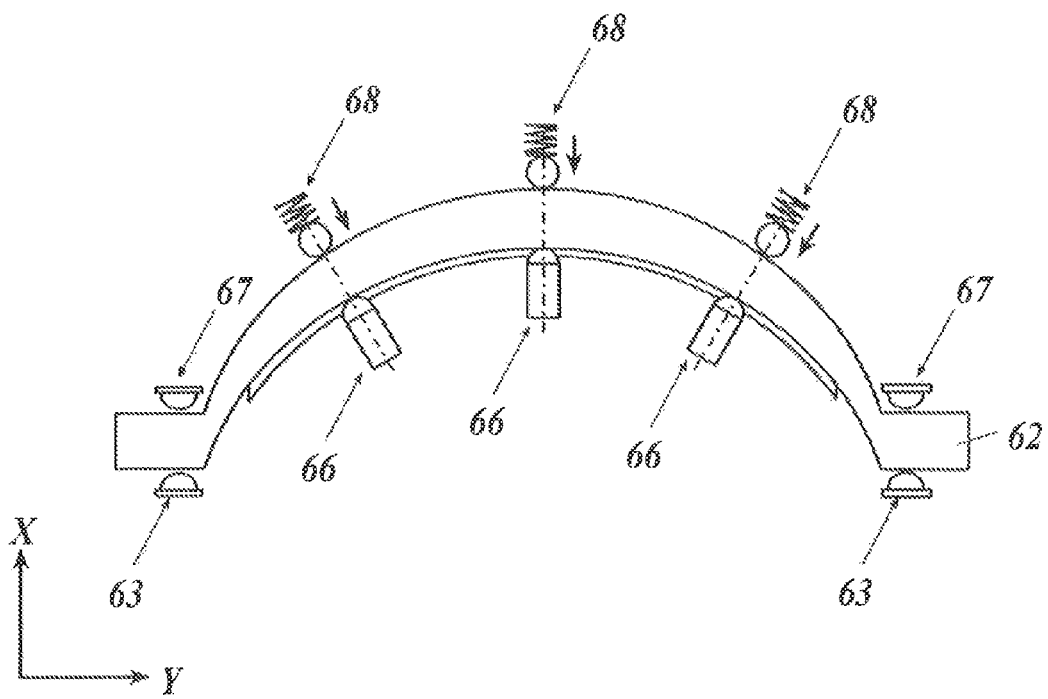
FIG. 19 is a side view schematically illustrating a state in which the retract state of the second pressing pin is released from the state shown in FIG. 18.

Next, the method makes the adjustment pin 66 rotated with the longitudinal direction of the adjustment pin 66 as the rotating axis while the optical element 62 is positioned with respect to the optical element holder 61, whereby the adjustment pin 66 is moved toward the optical element 62 to press the adjustment pin 66 against the optical element 62 (see FIG. 18). As a method for rotating the adjustment pin 66, a method for inserting a driver in the thread groove 662a formed in the lower surface of the held unit 662 to rotate the adjustment pin 66 can be cited as an example. The position where the adjustment pin 66 presses the optical element 62 is the adjustment position of the adjustment pin 66. For example, a moment when the adjustment pin 66 presses the optical element 62 can be recognized with sub-micrometer accuracy by observing a change of the beam position at a position equivalent to the surface position of the photoreceptor. Incidentally, the adjustment pins 66 are separately adjusted because the adjustment pins 66 differ from one another in the moving direction (C1 to C3 in the drawings).

As illustrated in FIGS. 13 and 17, the six adjustment pins 66 are disposed so as to hold each of both end portions (the upper end portion and lower end portion in the drawings) in the Z-direction of the optical element 62 at three points along the Y-direction, namely, the adjustment pins 66 hold the optical element 62 at six points (B1 to B6 in the drawings).

Then the method pulls the lock pin 686 inserted in the insertion hole 682a of the second pressing pin 68 so that the second pressing pin 68 is lowered in the longitudinal direction. In both the end portions in the Z-direction of the optical element 62, the positions opposite to the adjustment pins 66 are pressed and fixed by the second pressing pin 68s (see FIG. 19). Concretely, the six second pressing pins 68 are disposed so as to press each of both end portions in the Z-direction of the optical element 62 at three points along the Y-direction, namely, the second pressing pins 68 press the optical element 62 at six points.

Figure 20:
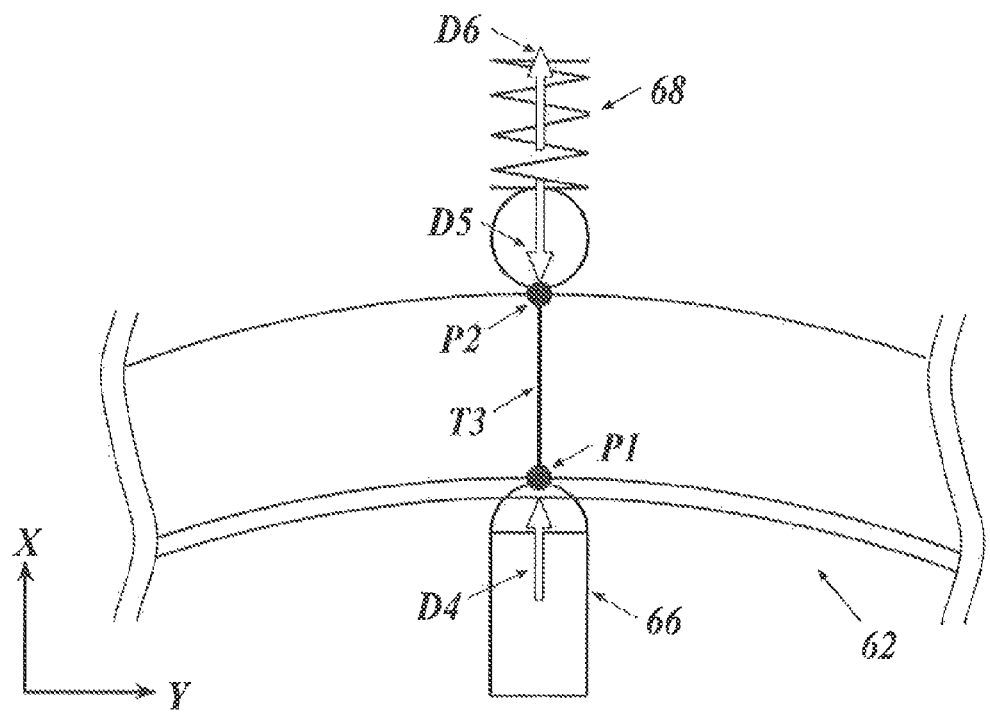
FIG. 20 is a side view schematically illustrating a positional relationship between the adjustment pin and the second pressing pin.

As illustrated in FIG. 20, it is assumed that P1 is a point at which the adjustment pin 66 and the optical element 62 come into contact with each other, and that P2 is a point at which the second pressing pin 68 and the optical element 62 come into contact with each other. A straight line T3 connecting the points P1 and P2, a moving direction D4 of the adjustment pin 66, a pressing direction D5 of the second pressing pin 68, and retract direction D6 of the second pressing pin 68 are parallel to one another.

Figure 21:
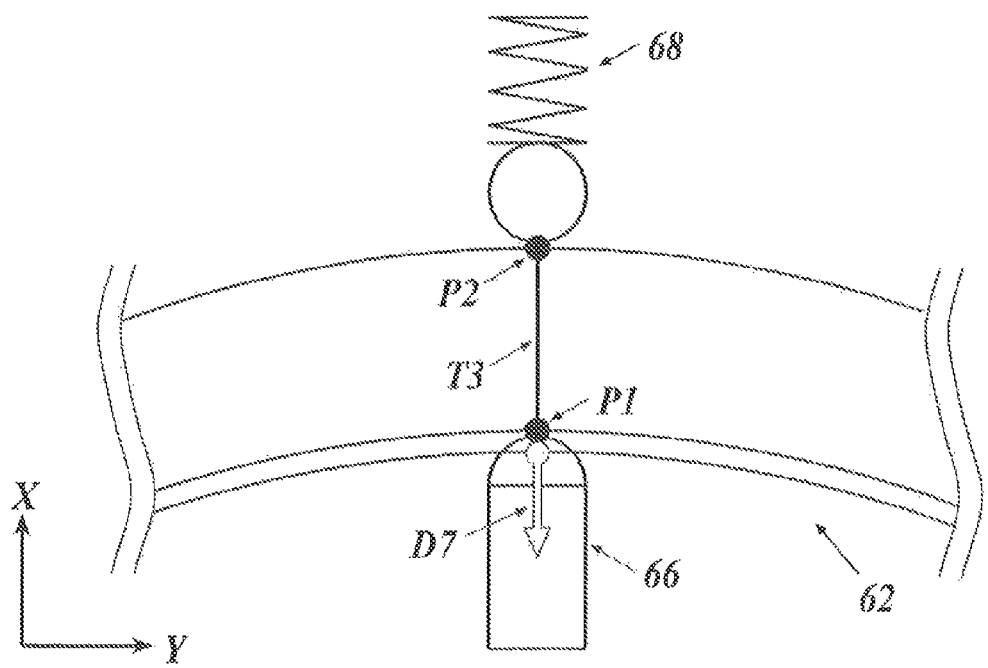
FIG. 21 is a side view schematically illustrating the positional relationship between the adjustment pin and the second pressing pin.

As illustrated in FIG. 21, the straight line T3 is parallel to a normal D7 of the optical plane in the vicinity of the point P1 at which the adjustment pin 66 and the optical element 62 come into contact with each other.

As described above, each of both end portions in the Z-direction of the optical element 62 are sandwiched between the adjustment pin 66 and the second pressing pin 68 at three points (i.e. totally six points) along the Y-direction. Therefore, the optical element 62 is fixed at many points, so that the optical element 62 is more stably fixed. The effect to suppress the deformation of the optical element 62 due to the environmental change can be expected as the pitch of the fixing point is narrowed. The Y-direction positioning pin 65 is pulled out after the adjustment pin 66 and the second pressing pin 68 are positioned to fix the optical element 62.

When performing the operation to sandwich the optical element 62 between the adjustment pins 66 and the second pressing pins 68, by monitoring the state of the optical element 62 with a measuring machine (not illustrated), the state of the strain generated in the optical element 62 can accurately be monitored and the operation can be easily performed.

As described above, the laser scanning apparatus 100 of the second embodiment includes: the holding pins 63 which hold the optical element 62 at the holding positions; the adjustment pins 66 which are configured to be able to be held while retracting from the optical element 62, and which moves in the direction in which the adjustment pins 66 press the optical element 62 held by the holding pins 63 from the retract state to press the optical element 62 to adjust the holding position of the optical element 62; and the second pressing pins 68 which are configured to be able to be held at the positions opposite to the adjustment pins 66 across the optical element 62 while retracting from the optical element 62, and which moves in the direction in which the second pressing pins 68 press the optical element 62 from the retract state to press the optical element 62, for which element 62 the holding position has been adjusted by the adjustment pins 66. Accordingly, the optical element 62 can be pressed and fixed by the second pressing pin 68 after positioning the adjustment pin 66 without generating the strain in the optical element 62, and the optical element 62 can be held with no strain.

Particularly, according to the laser scanning apparatus 100 of the second embodiment, the holding pins 63 position the optical element 62 at three points. Since a holding surface is generally determined by holding a member at three points, the member can be held with no strain by the three-point holding. Thus, according to the laser scanning apparatus 100 of the second embodiment, the adjustment pin 66 can press the optical element 62 while the optical element 62 is positioned with no strain, and therefore the optical element 62 can be held with no strain.

Additionally, according to the laser scanning apparatus 100 of the second embodiment, not only the optical element 62 is held at three points by the holding pins 63, but also the optical element 62 is further held at one (1) point or more by the adjustment pin 66 and/or the second pressing pin 68. Therefore, the optical element 62 is held at four points or more as a whole, and an effect to prevent a vibration can be improved.

In the laser scanning apparatus 100 of the second embodiment, the circular hole 685c in which the second pressing pin 68 can be inserted is made in the optical element holder 61. The laser scanning apparatus 100 includes the second pressing pin holder 685 which holds the second pressing pin 68 inserted in the circular hole 685c. The second pressing pin 68 includes the compression coil spring 684 which generates the pressing force in order to press the optical element 62 and the insertion hole 682a which is made on the side which does not press the optical element 62. The second pressing pin 68 includes the lock pin 686 which is formed so as to be able to be inserted in the insertion hole 682a, and which fixes the second pressing pin 68 while the second pressing pin 68 retracts from the optical element 62. The second pressing pin 68 can move in the direction in which the second pressing pin 68 presses the optical element 62 by pulling out the lock pin 686 from the second pressing pin 68, so that the retract state of the second pressing pin 68 can easily be released to improve work efficiency.

Although the second embodiment of the present invention is specifically described above, the second embodiment is not limited to the above contents, but various changes can be made without departing from the scope of the second embodiment.

(First Modification)

An example in FIGS. 22 and 23 differs from the second embodiment in the structures of the second pressing pin 68 and second pressing pin holder 685. The same configuration as the second embodiment is designated by the same numeral, and the detailed description is omitted.

A second pressing pin 68A according to a first modification includes: the cylindrical unit 681 formed into the cylindrical shape on the first end (the lower end in the drawings); the held unit 682 which is formed on the second end (the upper end in the drawings), and held by a second pressing pin holder 685A described later; the partition unit 683 provided along the boundary between the cylindrical unit 681 and the held unit 682 so as to partition the cylindrical unit 681 and the held unit 682; the compression coil spring 684 provided on the outer peripheral surface of the held unit 682; and the fixed lock pin 686A which is inserted in the insertion hole 682a made in the held unit 682 to be fixed. The optical element 62 can be pressed and fixed by inserting the second pressing pin 68A in the insertion hole 612b, which pierces through the optical element case 612 in the X-direction, from the above.

The fixed lock pin 686A is formed by the rod-shape member having the substantially same diameter as the insertion hole 682a. The fixed lock pin 686A is inserted in the insertion hole 682a, and fixed while both end portions of the fixed lock pin 686A project slightly from the insertion hole 682a.

The second pressing pin 68A of the first modification is held in the optical element cover 612 by the second pressing pin holder 685A.

The second pressing pin holder 685A is formed by the plate-like member, and includes the holding unit 685a which is formed into the substantial U-shape. The second pressing pin holder 685A includes the receiving space in which the second pressing pin 68A can be received, and is configured to hold the second pressing pin 68A. The second pressing pin holder 685A is elongated in the longitudinal direction (the Y-direction in the drawings) of the optical element cover 612, and both end portions in the longitudinal direction of the second pressing pin holder 685A are fixed to the optical element cover 612 by setscrews 685b.

The circular hole 685c having the substantially same diameter as the held unit 682 of the second pressing pin 68A is made in the substantial central portion of the holding unit 685a. The second pressing pin 68A can be held by inserting the circular hole 685c in the held unit 682.

A fitting groove 685d into which the fixed lock pin 686A can be fitted is formed along the longitudinal direction (the Y-direction in the drawings) in the substantially central portion in the short-length direction (the Z-direction in the drawings) of the holding unit 685a while being integral with the circular hole 685c.

Figure 22A:
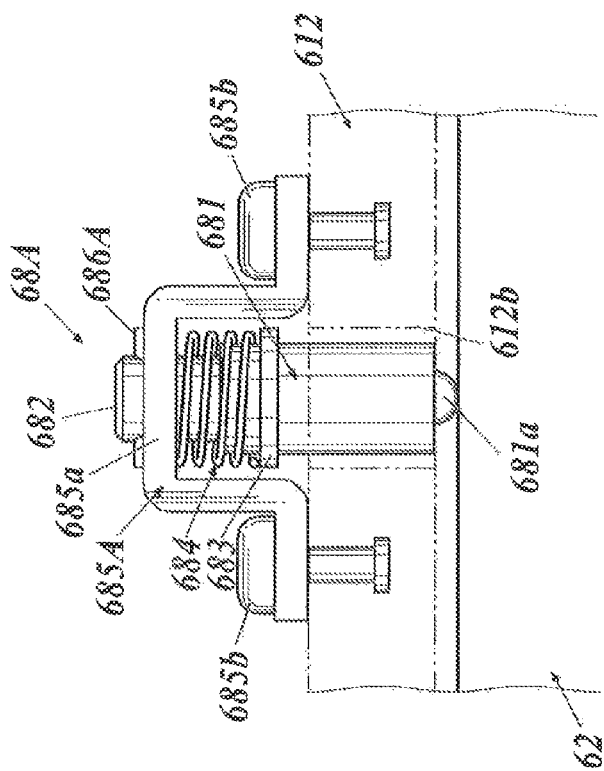
FIG. 22A is a side view illustrating a configuration of a second pressing pin according to a first modification of the second embodiment.
Figure 23A:
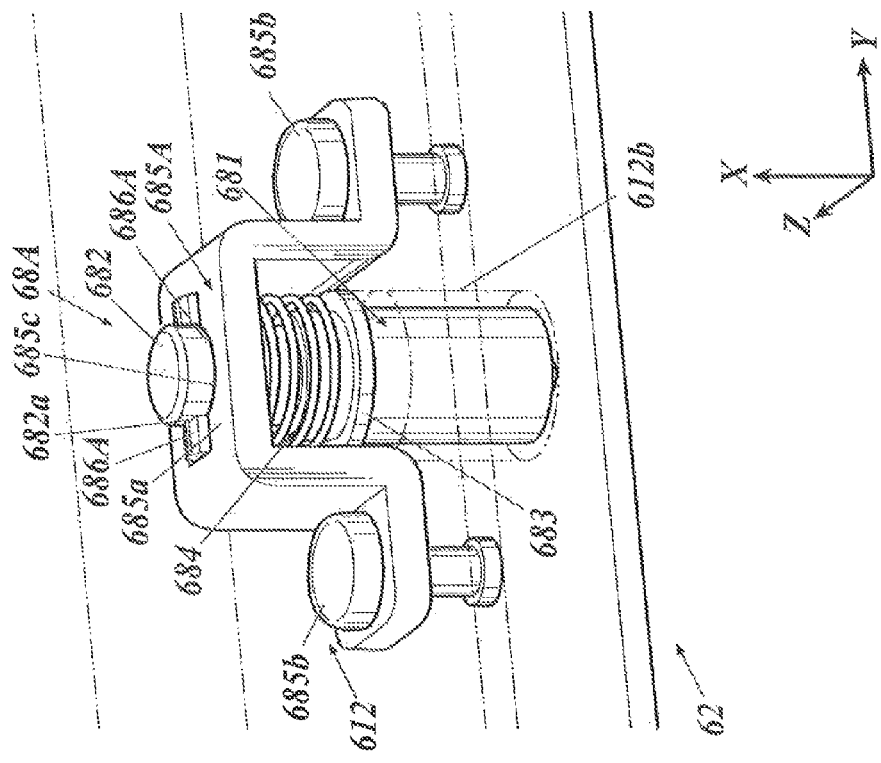
FIG. 23A is a perspective view illustrating the configuration of the second pressing pin according to the first modification of the second embodiment.

In the first modification, as illustrated in FIGS. 22A and 23A, in order to fix the second pressing pin 68A, the second pressing pin 68A is rotated with the moving direction of the second pressing pin 68A as the rotating axis such that the fixed lock pin 686A inserted in the insertion hole 682a of the held unit 682 is oriented toward the direction (the Z-direction in the drawings) orthogonal to the fitting groove 685d formed in the second pressing pin holder 685A, and the fixed lock pin 686A is positioned on the upper surface of the second pressing pin holder 685A. Thus, the second pressing pin 68A can be fixed while retracting from the optical element 62. In FIG. 22A, the numeral L2 designates a gap between the pressing portion 681a of the second pressing pin 68A and the optical element 62.

Figure 22B:
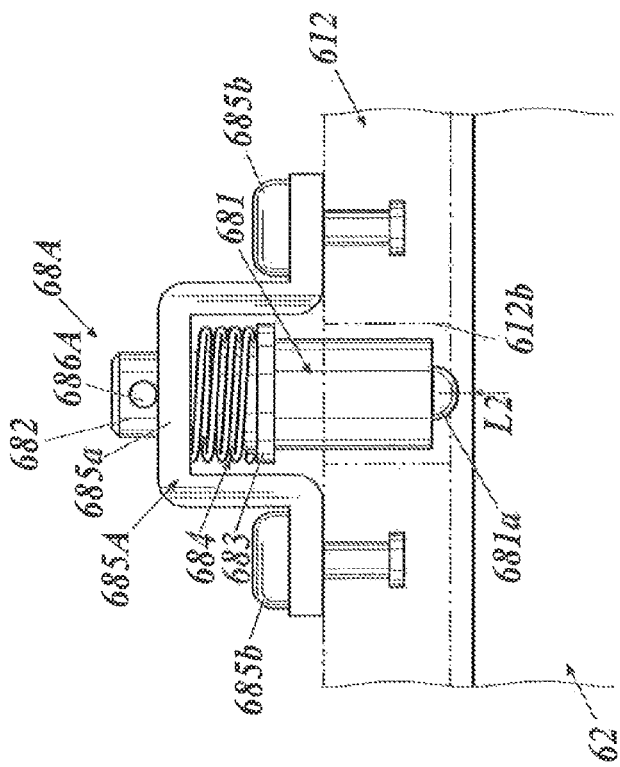
FIG. 22B is a side view illustrating the configuration of the second pressing pin according to the first modification of the second embodiment.
Figure 23B:
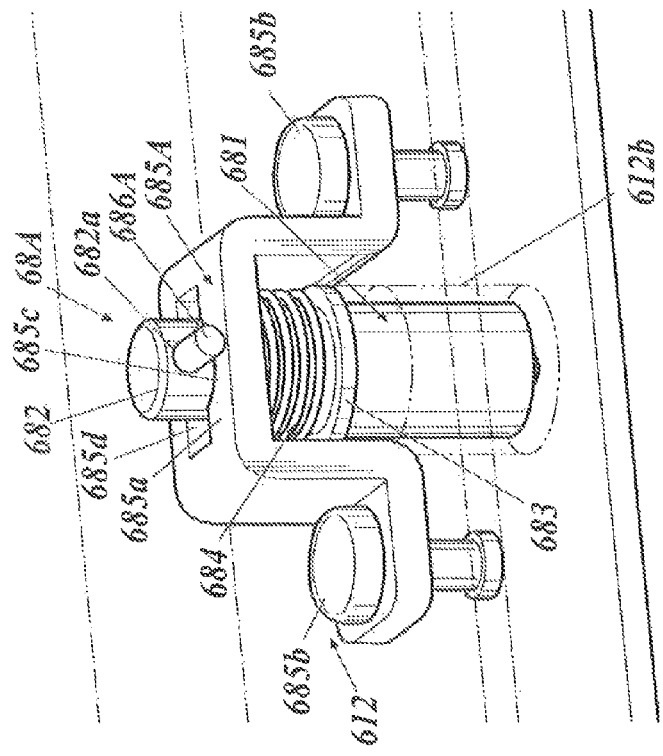
FIG. 23B is a perspective view illustrating the configuration of the second pressing pin according to the first modification of the second embodiment.

As illustrated in FIGS. 22B and 23B, the second pressing pin 68A is rotated to fit the fixed lock pin 686A into the fitting groove 685d, which allows the second pressing pin 68 to be lowered in the longitudinal direction to press the second pressing pin 68 against the optical element 62. As a method for rotating the second pressing pin 68A, a method for pinching or nipping a first end of the fixed lock pin 686A by fingers or a nipper to rotate the fixed lock pin 686A can be cited as an example.

In other words, the second pressing pin 68A is configured to be able to be held at the position opposite to the adjustment pin 66 across the optical element 62 while retracting from the optical element 62, the second pressing pin 68A moves in the direction in which the second pressing pin 68A presses the optical element 62 from the retract state, and the second pressing pin 68A serves as the pressing member to press the optical element 62.

As described above, according to the laser scanning apparatus 100 of the first modification, the optical element holder 61 includes the second pressing pin holder 685A. The second pressing pin holder 685A includes the circular hole 685c into which the second pressing pin 68A can be inserted, and the second pressing pin holder 685A holds the second pressing pin 68A while the second pressing pin 68A is inserted in the circular hole 685c. The second pressing pin 68A includes the compression coil spring 684 and the fixed lock pin 686A. The compression coil spring 684 generates the pressing force in order to press the optical element 62. The fixed lock pin 686A is fixed while inserted in the insertion hole 682a formed on the second end, the fixed lock pin 686A is positioned in the direction orthogonal to the fitting groove 685d, which is formed in the second pressing pin holder 685A while being integral with the circular hole 685c, and the fixed lock pin 686A fixes the second pressing pin 68A while the second pressing pin 68A retracts from the optical element 62. The second pressing pin 68A is rotated with the moving direction of the second pressing pin 68A as the rotating axis, and the fixed lock pin 686A is fitted in the fitting groove 685d, which allows the second pressing pin 68A to move in the direction in which the second pressing pin 68A presses the optical element 62. Therefore, the retract state of the second pressing pin 68A can easily be released to improve the work efficiency.

(Second Modification)

An example in FIGS. 24 and 25 differs from the second embodiment in the structures of the second pressing pin 68 and second pressing pin holder 685 and the shape of the insertion hole 612b made in the optical element cover 612. For the sake of convenience, the same configuration as the second embodiment is designated by the same numeral, and the detailed description is omitted.

A second pressing pin 68B according to a second modification includes: a hollow cylindrical unit 681B formed into the cylindrical shape on a first end (the lower end in the drawings); a held unit 682B which is formed into the cylindrical shape on a second end (the upper end in the drawings), and held by a second pressing pin holder 685B; a pressing portion 687B which is inserted in the insertion hole 681b made in the lower surface of the cylindrical unit 681B; a disc unit 688B which is provided in the cylindrical unit 681B while being integral with the pressing portion 687B; and a compression coil spring 684B which is provided in the cylindrical unit 681B, a first end of the compression coil spring 684B pressing the upper surface of the disc unit 688B, and a second end pressing the lower surface in the upper end of the cylindrical unit 681B. The optical element 62 can be pressed and fixed by inserting the second pressing pin 68B in the insertion hole 612b, which pierces through the optical element case 612 in the X-direction, from the upper side. In the second modification, a bearing surface 612c which presses the lower surface of the cylindrical unit 681B is formed in the lower end of the insertion hole 612b made in the optical element cover 612. For the sake of convenience, in FIGS. 24 and 25, the cylindrical unit 681B is illustrated by the alternate long and two short dashes line such that the internal structure of the cylindrical unit 681B is easily seen.

The cylindrical unit 681B is formed by the hollow cylindrical member, and the insertion hole 681b, which pierces through the second pressing pin 68B in the longitudinal direction (the X-direction in the drawings), is made in the substantially central portion of the lower surface of the cylindrical unit 681B.

The male screw is formed on the outer peripheral surface of the held unit 682B, and a cross-shaped thread groove 682b is formed in the upper surface of the held unit 682B. Thus, the held unit 682B is formed so as to engage a circular hole 685cB of the second pressing pin holder 685B, and the held unit 682B serves as the screw unit.

The pressing portion 687B is formed into the cylindrical shape having the substantially same diameter as the insertion hole 681b, and the lower end of the pressing portion 687B is formed into the spherical shape. The pressing portion 687B presses the optical element 62. In the second modification, the radius at the lower end of the pressing portion 687B formed into the spherical shape is equal to that of the pressing portion 661a of the adjustment pin 66.

The disc unit 688B is formed into the disc shape having the substantially same diameter as the inner diameter of the cylindrical unit 681B, and the upper end of the pressing portion 687B is fixed to the substantially central portion of the lower surface of the disc unit 688B.

In the compression coil spring 684B, a first end of the compression coil spring 684B presses the upper surface of the disc unit 688B, and a second end presses the lower surface in the upper end of the cylindrical unit 681B. The compression coil spring 684B downwardly presses the pressing portion 687B in the longitudinal direction through the disc unit 688B to generate the pressing force for pressing the optical element 62.

The second pressing pin 68B is held in the optical element cover 612 by the second pressing pin holder 685B.

The second pressing pin holder 685B is formed by the plate-like member, and includes the holding unit 685a which is formed into the substantial U-shape. The second pressing pin holder 685B includes the receiving space in which the second pressing pin 68B can be received, and is configured to hold the second pressing pin 68B. The second pressing pin holder 685B is elongated in the longitudinal direction (the Y-direction in the drawings) of the optical element cover 612, and both the end portions in the longitudinal direction of the second pressing pin holder 685B are fixed to the optical element cover 612 by setscrews 685b.

The circular hole 685cB having the substantially same diameter as the held unit 682B of the second pressing pin 68B is made in the substantial central portion of the holding unit 685a. The second pressing pin 68B can be held by inserting the circular hole 685cB in the held unit 682B.

Figure 24A:
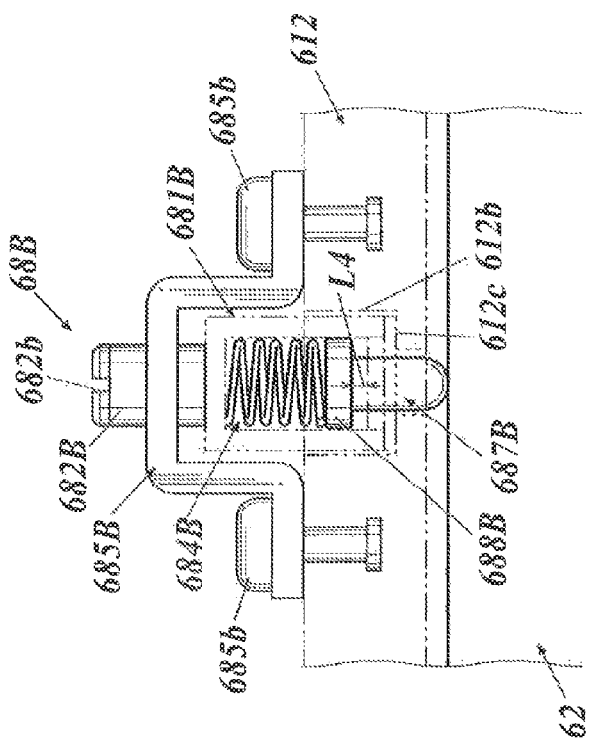
FIG. 24A is a side view illustrating a configuration of a second pressing pin according to a second modification of the second embodiment.
Figure 24B:
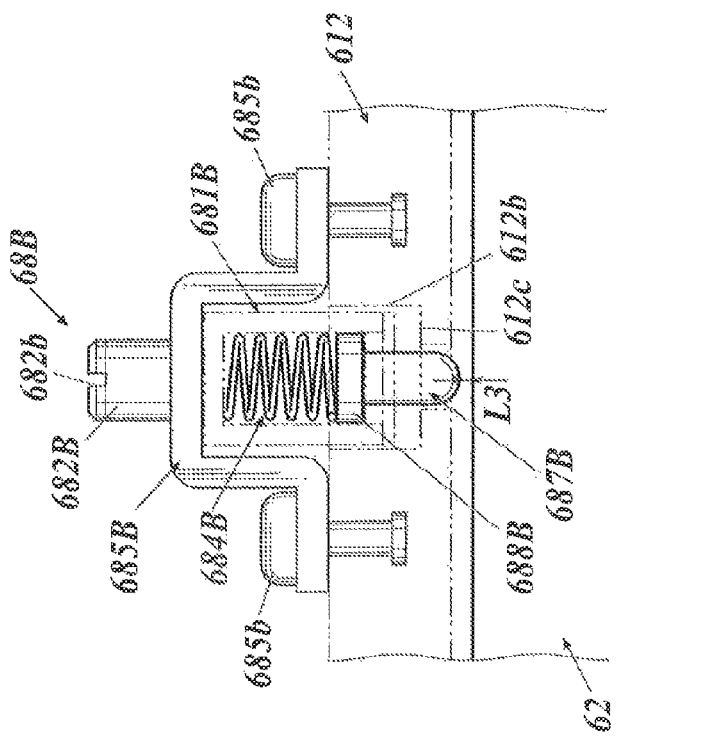
FIG. 24B is a side view illustrating the configuration of the second pressing pin according to the second modification of the second embodiment.
Figure 25A:
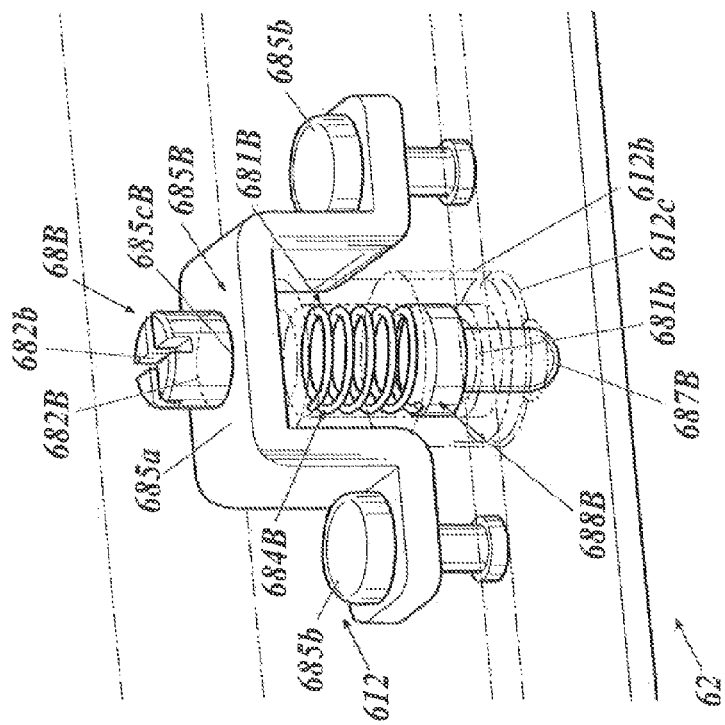
FIG. 25A is a perspective view illustrating the configuration of the second pressing pin according to the second modification of the second embodiment.
Figure 25B:
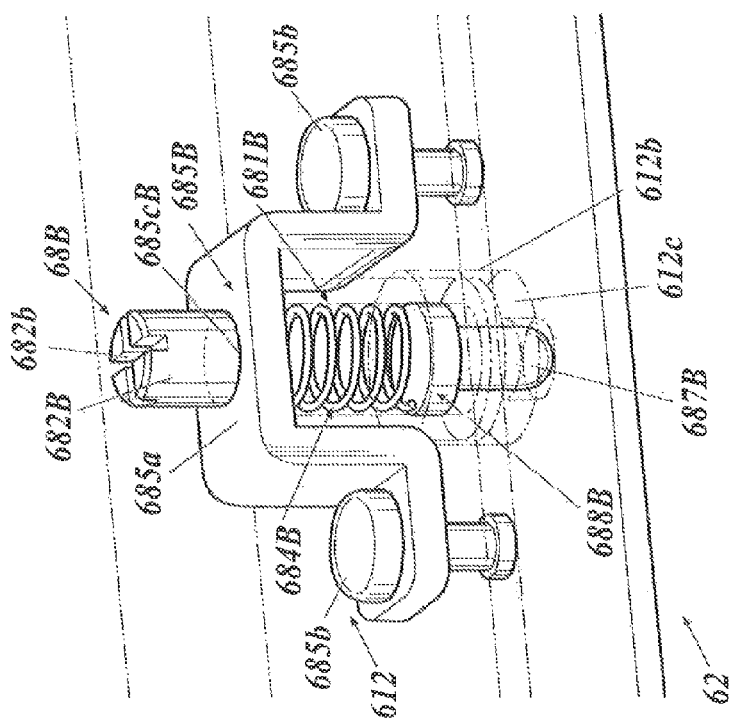
FIG. 25B is a perspective view illustrating the configuration of the second pressing pin according to the second modification of the second embodiment.

The female screw which engages the male screw formed on the outer peripheral surface of the held unit 682B is formed in the inner peripheral surface of the circular hole 685cB. The second pressing pin 68B can advance/retract in the longitudinal direction by rotating the second pressing pin 68B with the longitudinal direction (the X-direction in the drawings) of the second pressing pin 68B as the rotating axis. As the method for rotating the second pressing pin 68B, a method for inserting a driver in the thread groove 682b formed in the upper surface of the held unit 682B can be cited. FIGS. 24A and 25A illustrate the state before the second pressing pin 68B is adjusted. In FIG. 24A, the numeral L3 designates a gap between the pressing portion 687B of the second pressing pin 68B and the optical element 62. FIGS. 24B and 25B illustrate the state, in which the second pressing pin 68B is downwardly moved in the longitudinal direction by rotating the second pressing pin 68B with the moving direction of the second pressing pin 68B as the rotating axis and the pressing portion 687B presses the optical element 62.

Thus, the second pressing pin 68B is configured to be able to be held at the position opposite to the adjustment pin 66 across the optical element 62 while retracting from the optical element 62, the second pressing pin 68B moves in the direction in which the second pressing pin 68B presses the optical element 62 from the retract state, and the second pressing pin 68B serves as the pressing member to press the optical element 62.

In the second modification, as illustrated in FIGS. 24A and 25A, in the retract state before the adjustment, the lower surface of the disc unit 688B presses the upper surface in the lower end of the cylindrical unit 681B.

Meanwhile, in the case that the second pressing pin 68B is rotated to move downward in the longitudinal direction, the pressing portion 687B presses the optical element 62. When the second pressing pin 68B is further rotated after the pressing portion 687B presses the optical element 62, the cylindrical unit 681B moves continuously downward. However, because the position of the pressing portion 687B pressing the optical element 62 does not change, a gap is generated between the lower surface of the disc unit 688B and the upper surface in the lower end of the cylindrical unit 681B. When the second pressing pin 68B is further rotated, as illustrated in FIGS. 24B and 25B, the lower surface of the cylindrical unit 681B presses the bearing surface 612c to stop the downward movement of the cylindrical unit 681B. The second modification includes the above structure, so that the excessive pressing of the pressing portion 687B against the optical element 62 can be prevented. In FIG. 24B, the numeral L4 designates a gap between the lower surface of the disc unit 688B and the upper surface in the lower end of the cylindrical unit 681B when the lower surface of the cylindrical unit 681B presses the bearing surface 612c.

As described above, according to the laser scanning apparatus 100 of the second modification, the optical element holder 61 includes the second pressing pin holder 685B. The second pressing pin holder 685B includes the circular hole 685cB in which the second pressing pin 68B can be inserted, and the second pressing pin holder 685B holds the second pressing pin 68B while the second pressing pin 68B is inserted in the circular hole 685cB. The inner peripheral surface of the circular hole 685cB is formed so as to engage the held unit 682B formed on the second end of the second pressing pin 68B. The second pressing pin 68B includes the compression coil spring 684B which generates the pressing force in order to press the optical element 62. The second pressing pin 68B is rotated with the moving direction of the second pressing pin 68B as the rotating axis, which allows the second pressing pin 68B to move in the direction in which the second pressing pin 68B presses the optical element 62. Therefore, the retract state of the second pressing pin 68B can easily be released to improve the work efficiency.

(Other Modifications)

Figure 26:
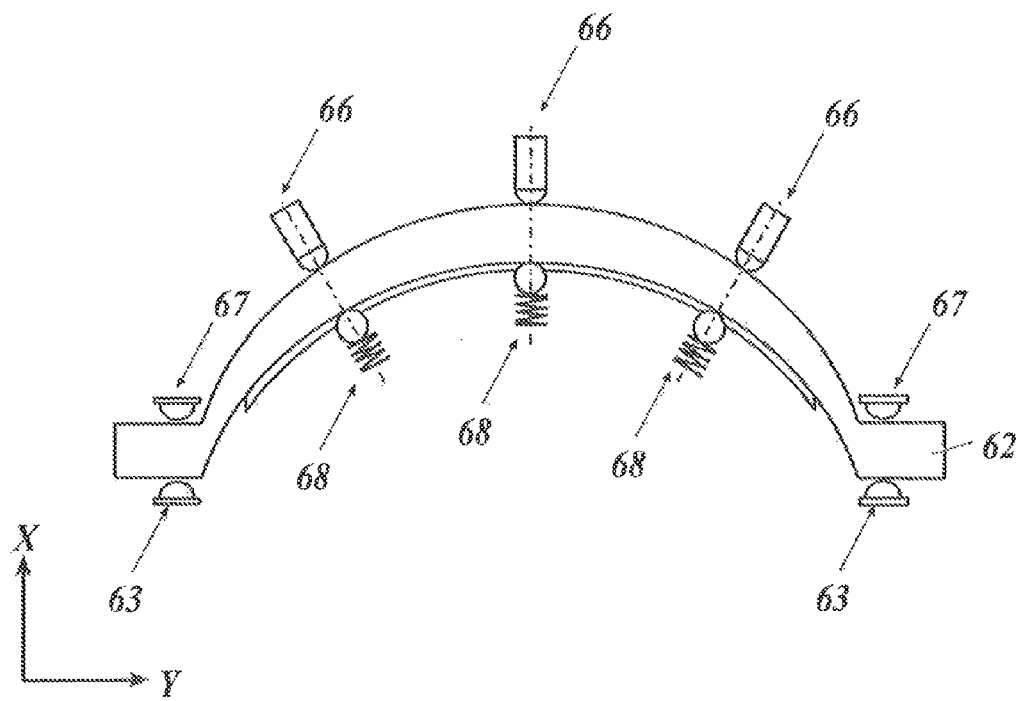
FIG. 26 is a side view illustrating a modification of arrangement of the adjustment pins and second pressing pins.

In the second embodiment, the optical element 62 is held from below in the X-direction by the adjustment pin 66, and pressed from above in the X-direction by the second pressing pin 68, thereby fixing the optical element 62. However, the second embodiment is not limited to such configuration. For example, as illustrated in FIG. 26, the positional relationship between the adjustment pin 66 and the second pressing pin 68 may be reversed compared with the positional relationship of the second embodiment. In other words, the optical element 62 is held from above in the X-direction by the adjustment pin 66, and pressed from below in the X-direction by the second pressing pin 68, whereby the optical element 62 may be fixed.

Figure 27:
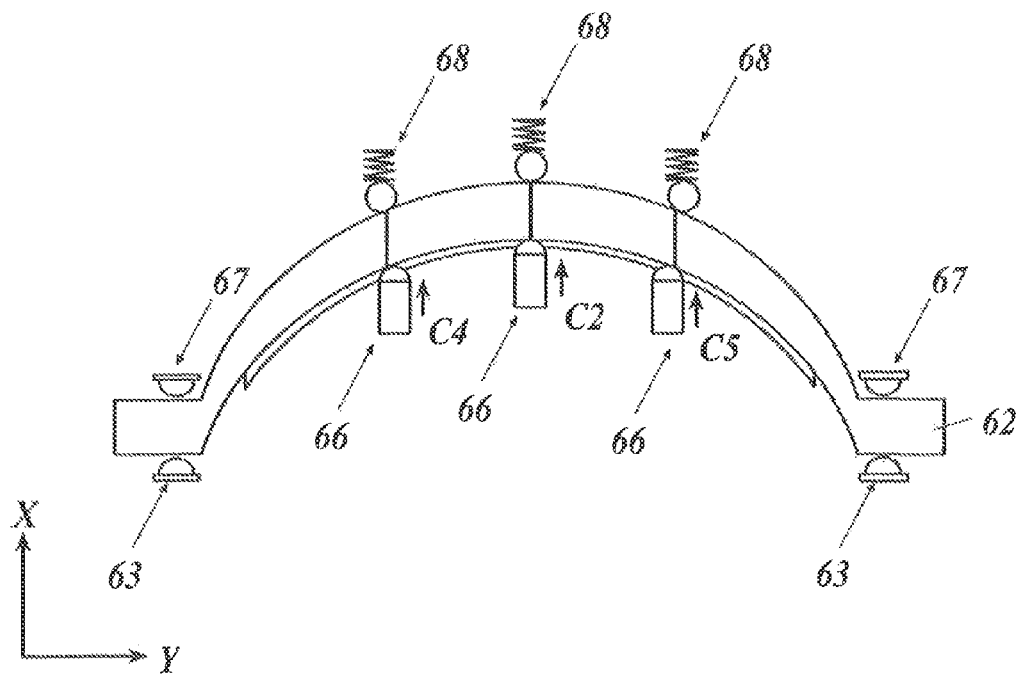
FIG. 27 is a side view illustrating a modification of arrangement and moving directions of the adjustment pins and second pressing pins.

In the second embodiment, as illustrated in FIGS. 18 to 21, the adjustment pin 66 and the second pressing pin 68 are moved in the direction parallel to the normal D7 with respect to the optical surface in the vicinity of the point P1 at which the adjustment pin 66 and the optical element 62 come into contact with each other. However, the second embodiment is not limited to such configuration. For example, as illustrated in FIG. 27, the adjustment pin 66 and the second pressing pin 68 may be disposed such that the moving direction (C2, C4, and C5 in the drawings) of the adjustment pin 66, the moving direction of the second pressing pin 68, and the straight line connecting the point at which the adjustment pin 66 and the optical element 62 come into contact with each other and the point at which the second pressing pin 68 and the optical element 62 come into contact with each other are parallel to one another. According to this configuration, the moving directions of the adjustment pin 66 and second pressing pin 68 become identical to each other, so that a work range can be narrowed to improve workability.

In the second embodiment, the present invention is applied to the elongated optical element 62. However, the present invention is not limited to the elongated optical element 62. The present invention can be applied to any optical element as long as the optical element has the shape in which the positioning is required with respect to the optical element holder.

In the second embodiment, the present invention is applied to the third optical system 6 of the laser scanning apparatus 100. However, the present invention is not limited to the third optical system 6. The present invention may be applied to another optical system of the laser scanning apparatus 100, or the optical element included in the optical device except the laser scanning apparatus 100.

In the second embodiment, the optical element 62 is positioned and fixed by the holding pin 63 and the first pressing pin 67 at one (1) position in the first end portion in the Y-direction and two positions in the second end portion in the Y-direction. However, the second embodiment is not limited to such configuration. The optical element 62 may be positioned at any number of positions as long as the optical element 62 can be positioned. For example, the first end portion in the Y-direction of the optical element 62 is fixed at one (1) point similarly to the second embodiment, and the second end portion in the Y-direction may be fixed and positioned by a member having the width greater than that of the holding pin 63 and first pressing pin 67.

In the second embodiment, the optical element 62 may be fixed at the total of six points by the adjustment pin 66a and the second pressing pin 68. However, the second embodiment is not limited to such configuration. The optical element 62 may be fixed at any position. For example, the optical element 62 may be fixed at only one (1) position or ten positions.

Additionally, the detailed configuration and detailed operation of each device constituting the laser scanning apparatus and image forming apparatus may properly be changed without departing from the scope of the second embodiment.

According to an aspect of the preferred embodiment of the present invention, there is provided a fixing structure for fixing an optical element at a predetermined position in an optical device, the fixing structure including: a plurality of first pressing members to fix the optical element at at least two positions on a surface of the optical element orthogonal to an optical axis of the optical element; and a second pressing member to fix the optical element at a predetermined position on a surface of the optical element to the optical axis; and wherein a depth of pressing of the surface of the optical element by a tip of the second pressing member is larger than the depth of pressing of the surface of the optical element by the tips of the first pressing members.

In this fixing structure for fixing an optical element, the expansion/contraction of the optical element can smoothly be performed due to the environmental change, and the misalignment of the optical element can largely be suppressed.

According to an aspect of the preferred embodiment of the present invention, there is provided a fixing structure for fixing an optical element at a predetermined position in an optical device including: a holding member to hold the optical element at a predetermined holding position; an adjustment member to adjust the holding position by pressing a surface of the optical element held by the holding member; and a pressing member to press the optical element the holding position of which is adjusted by the adjustment member; and wherein the adjustment member is configured to be able to be held at a first retract position, and presses the surface of the optical element by moving from the first retract position toward the optical element, and wherein the pressing member is configured to be able to be held at a second retract position located opposite to the adjustment member across the optical element, and presses the optical element by moving from the second retract position toward the optical element.

In the fixing structure for fixing the optical element, the optical element can be held with no strain.

According to an aspect of the preferred embodiment of the present invention, there is provided a fixing method to fix an optical element at a predetermined position in an optical device comprising the steps of: holding the optical element at a predetermined holding position; moving an adjustment member held at a first retract position toward the optical element to press the optical element for adjustment of the holding position; and thereafter moving a pressing member held at a second retract position opposite to the adjustment member across the optical element toward the optical element to press the optical element.

In the method for fixing the optical element, the optical element can be held with no strain.

The present U.S. patent application claims a priority under the Paris Convention of Japanese patent application No. 2012-115223 filed on May 21, 2012, and of Japanese patent application No. 2012-150962 filed on Jul. 5, 2012, in which all contents of this application are disclosed, and each of the Japanese applications are hereby incorporated by reference.

What is claimed is:

1. A fixing structure for fixing an optical element at a predetermined position in an optical device comprising:
- a holding member to hold the optical element at a predetermined holding position;
- an adjustment member to adjust the holding position by pressing the optical element held by the holding member;
- a pressing member to press the optical element the holding position of which is adjusted by the adjustment member,
- wherein the adjustment member is configured to be able to be held at a first retract position, and presses the optical element by moving from the first retract position toward the optical element; and
- a pressing member holding mechanism to hold the pressing member at a second retract position located opposite to the adjustment member across the optical element, wherein the pressing member presses the optical element by moving from the second retract position toward the optical element, and
- wherein at least one of the adjustment member and the pressing member is disposed along a normal vector to a surface of the optical element through which an optical axis of the optical element passes.

2. The fixing structure of claim 1, wherein the holding member holds the optical element at at least three points.

3. The fixing structure of claim 1, wherein a line between a point where the adjustment member and the optical element contact with each other and a point where the pressing member and the optical element contact with each other, is parallel to a normal vector to the surface of the optical element at the point where the adjustment member and the optical element contact with each other.

4. The fixing structure of claim 1, wherein a plurality of the adjustment members are disposed to a longitudinal direction of the optical element, and moving directions of the plurality of the adjustment members are different from each other.

5. The fixing structure of claim 4, wherein the plurality of the adjustment members are disposed with plural line arrangements in a short direction of the optical element.

6. The fixing structure of claim 1, wherein a line between a point where the adjustment member and the optical element contact with each other and a point where the pressing member and the optical element contact with each other, a moving direction of the adjustment member, and a moving direction of the pressing member are parallel.

7. The fixing structure of claim 1, wherein a tip of the adjustment member and a tip of the pressing member are spherical, and a radius of the tip of the adjustment member is equal to the radius of the tip of the pressing member.

8. The fixing structure of claim 1, further comprising:
- an optical element holder to hold the optical element using the holding member; and
- a pressing member holder to hold the pressing member being inserted in a hole formed on the pressing member holder; and
- wherein the pressing member includes:
- a spring to generate a pressure for pressing the optical element;
- a pin hole; and
- the pressing member holding mechanism includes a pin to hold the pressing member at the second retract position when the pin is inserted into the pin hole positioned above the pressing member holder; and
- wherein the pressing member is moved toward the optical element when the pin is pulled out of the pin hole.

9. The fixing structure of claim 1, further comprising:
- an optical element holder to hold the optical element using the holding member; and
- a pressing member holder to hold the pressing member being inserted in a hole formed on the pressing member holder; and
- wherein the pressing member includes:
- a spring to generate a pressure for pressing the optical element;
- a pin hole;
- the pressing member holding mechanism includes a pin to hold the pressing member at the second retract position when the pin is inserted into the pin hole; and
- a groove formed on the pressing member holder and formed integrally with the hole of the pressing member holder; and
- wherein the pressing member is held at the second retract position with the pin being put on the pressing member holder to a direction orthogonal to the groove, and
- wherein the pressing member is moved toward the optical element by being rotated around a rotational axis along to a moving direction of the pressing member and fitted the pin together with the groove.

10. The fixing structure of claim 1, further comprising:
- an optical element holder to hold the optical element using the holding member; and
- a pressing member holder to hold the pressing member being inserted in a hole formed on the pressing member holder; and
- wherein the pressing member holding mechanism includes an internal surface of the hole of the pressing member holder formed to be engage with a screw formed on the pressing member, and wherein the pressing member includes a spring to generate a pressure for pressing the optical element, and is moved toward the optical element by being rotated around a rotational axis along to a moving direction of the pressing member.

11. A laser scanning apparatus comprising:
a light source to emit a laser light;
a deflection unit to deflect the laser light emitted from the laser source;
an optical element to condense the laser light deflected by the deflection unit on an image carrier; and
the fixing structure of claim 1.

12. A image forming apparatus comprising:
a charging unit to charge a surface of the image carrier;
the laser scanning apparatus of claim 11 to irradiate the laser light on the surface of the image carrier charged by the charging unit and form an electrostatic latent image;
a developing unit to develop the electrostatic latent image on the surface of the image carrier;
a transferring unit to transfer the image developed by the developing unit to a recording sheet; and
a fixing unit to fix the image transferred by the transferring section onto the recording sheet.

13. A fixing method to fix an optical element at a predetermined position in an optical device by an adjustment member and a pressing member, at least one of the adjustment member and the pressing member being disposed along a normal vector to a surface of the optical element through which an optical axis of the optical element passes, comprising the steps of:
holding the optical element at a predetermined holding position;
moving the adjustment member held at a first retract position toward the optical element to press the optical element for adjustment of the holding position;
holding, by a pressing member holding mechanism, the pressing member at a second retract position located opposite the adjustment member across the optical element; and
thereafter moving the pressing member held at the second retract position opposite to the adjustment member across the optical element toward the optical element to press the optical element.

* * * * *